(12) United States Patent
Wolrich et al.

(10) Patent No.: US 7,111,296 B2
(45) Date of Patent: *Sep. 19, 2006

(54) THREAD SIGNALING IN MULTI-THREADED PROCESSOR

(75) Inventors: Gilbert Wolrich, Framingham, MA (US); Debra Bernstein, Sudbury, MA (US); Donald Hooper, Shrewsbury, MA (US); Matthew J. Adiletta, Worc, MA (US); William Wheeler, Southboro, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/615,280

(22) Filed: Jul. 8, 2003

(65) Prior Publication Data

US 2004/0098496 A1 May 20, 2004

Related U.S. Application Data

(63) Continuation of application No. 09/473,799, filed on Dec. 28, 1999, now Pat. No. 6,625,654.

(51) Int. Cl.
  *G06F 9/46* (2006.01)
(52) U.S. Cl. .................. 718/102; 718/100; 718/107; 712/235
(58) Field of Classification Search ............... 709/230, 709/238; 718/100–102, 107–108; 712/235
  See application file for complete search history.

(56) References Cited

U.S. PATENT DOCUMENTS

| | | |
|---|---|---|
| 3,373,408 A | 3/1968 | Ling |
| 3,478,322 A | 11/1969 | Evans |
| 3,792,441 A | 2/1974 | Wymore et al. |
| 3,940,745 A | 2/1976 | Sajeva |
| 4,016,548 A | 4/1977 | Law et al. |
| 4,032,899 A | 6/1977 | Jenny et al. |
| 4,075,691 A | 2/1978 | Davis et al. |
| 4,130,890 A | 12/1978 | Adam |
| 4,400,770 A | 8/1983 | Chan et al. |
| 4,514,807 A | 4/1985 | Nogi |
| 4,523,272 A | 6/1985 | Fukunaga et al. |
| 4,745,544 A | 5/1988 | Renner et al. |
| 4,788,640 A | 11/1988 | Hansen |
| 4,831,358 A | 5/1989 | Ferrio et al. |

(Continued)

FOREIGN PATENT DOCUMENTS

EP  0 379 709  8/1990

(Continued)

OTHER PUBLICATIONS

"10-/100-Mbps Ethernet Media Access Controller (MAC) Core", NEC, 1998, pp. 1-5.

(Continued)

*Primary Examiner*—Bunjob Jaroenchonwanit
*Assistant Examiner*—Phuoc H. Nguyen
(74) *Attorney, Agent, or Firm*—Fish & Richardson P.C.

(57) ABSTRACT

A parallel hardware-based multithreaded processor is described. The processor includes a general purpose processor that coordinates system functions and a plurality of microengines that support multiple program threads. The processor also includes a memory control system that has a first memory controller that sorts memory references based on whether the memory references are directed to an even bank or an odd bank of memory and a second memory controller that optimizes memory references based upon whether the memory references are read references or write references. A program thread communication scheme for packet processing is also described.

27 Claims, 17 Drawing Sheets

U.S. PATENT DOCUMENTS

| | | |
|---|---|---|
| 4,866,664 A | 9/1989 | Burkhardt, Jr. et al. |
| 4,991,112 A | 2/1991 | Callemyn |
| 5,115,507 A | 5/1992 | Callemyn |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,255,239 A | 10/1993 | Taborn et al. |
| 5,263,169 A | 11/1993 | Genusov et al. |
| 5,347,648 A | 9/1994 | Stamm et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,482 A | 4/1995 | Stamm et al. |
| 5,404,484 A | 4/1995 | Bennett |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,476 A | 10/1996 | Sherer et al. |
| 5,568,617 A | 10/1996 | Kametani |
| 5,574,922 A | 11/1996 | James |
| 5,592,622 A | 1/1997 | Isfeld et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,641 A | 5/1997 | Perotto et al. |
| 5,644,623 A | 7/1997 | Gutledge |
| 5,649,157 A | 7/1997 | Williams |
| 5,659,687 A | 8/1997 | Kim et al. |
| 5,680,641 A | 10/1997 | Sidman |
| 5,689,566 A | 11/1997 | Nguyen |
| 5,699,537 A | 12/1997 | Sharangpani et al. |
| 5,701,434 A | 12/1997 | Nakagawa |
| 5,717,898 A | 2/1998 | Kagan et al. |
| 5,721,870 A | 2/1998 | Matsumoto |
| 5,740,402 A | 4/1998 | Bratt et al. |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,764,915 A | 6/1998 | Heimsoth et al. |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,832,215 A | 11/1998 | Kato et al. |
| 5,835,755 A | 11/1998 | Stellwagen, Jr. |
| 5,850,530 A | 12/1998 | Chen et al. |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,918,235 A * | 6/1999 | Kirshenbaum et al. ..... 707/206 |
| 5,928,736 A | 7/1999 | Muller et al. |
| 5,937,187 A | 8/1999 | Kosche et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,958,031 A | 9/1999 | Kime |
| 5,961,628 A | 10/1999 | Nguyen et al. |
| 5,970,013 A | 10/1999 | Fischer et al. |
| 5,978,838 A | 11/1999 | Mohamed et al. |
| 5,983,274 A | 11/1999 | Hyder et al. |
| 5,995,513 A | 11/1999 | Harrand et al. |
| 6,012,151 A | 1/2000 | Mano |
| 6,014,729 A | 1/2000 | Lannan et al. |
| 6,023,742 A | 2/2000 | Ebeling et al. |
| 6,058,168 A | 5/2000 | Braband |
| 6,061,710 A * | 5/2000 | Eickemeyer et al. ........ 718/107 |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,079,008 A | 6/2000 | Clery, III |
| 6,085,215 A * | 7/2000 | Ramakrishnan et al. .... 718/102 |
| 6,085,294 A | 7/2000 | Van Doren et al. |
| 6,092,127 A | 7/2000 | Tausheck |
| 6,092,158 A | 7/2000 | Harriman et al. |
| 6,111,886 A | 8/2000 | Stewart |
| 6,112,016 A | 8/2000 | MacWilliams et al. |
| 6,134,665 A | 10/2000 | Klein et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,157,955 A | 12/2000 | Narad et al. |
| 6,160,562 A | 12/2000 | Chin et al. |
| 6,170,051 B1 | 1/2001 | Dowling |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 * | 4/2001 | Kahle et al. ................. 718/102 |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,274 B1 | 4/2001 | Catthoor et al. |
| 6,223,279 B1 | 4/2001 | Nishimura et al. |
| 6,247,025 B1 | 6/2001 | Bacon |
| 6,256,713 B1 | 7/2001 | Audityan et al. |
| 6,269,391 B1 * | 7/2001 | Gillespie ..................... 718/102 |
| 6,272,616 B1 | 8/2001 | Fernando et al. |
| 6,275,505 B1 | 8/2001 | O'Loughlin et al. |
| 6,279,113 B1 | 8/2001 | Vaidya |
| 6,286,083 B1 | 9/2001 | Chin et al. |
| 6,289,011 B1 | 9/2001 | Seo et al. |
| 6,298,370 B1 | 10/2001 | Tang et al. |
| 6,307,789 B1 | 10/2001 | Wolrich et al. |
| 6,324,624 B1 | 11/2001 | Wolrich et al. |
| 6,338,078 B1 * | 1/2002 | Chang et al. ................ 718/102 |
| 6,345,334 B1 | 2/2002 | Nakagawa et al. |
| 6,347,344 B1 | 2/2002 | Baker et al. |
| 6,356,692 B1 | 3/2002 | Kasper et al. |

| | | | |
|---|---|---|---|
| 6,360,262 | B1 | 3/2002 | Guenthner et al. |
| 6,366,998 | B1 | 4/2002 | Mohamed |
| 6,373,848 | B1 | 4/2002 | Allison et al. |
| 6,389,449 | B1 | 5/2002 | Nemirovsky et al. |
| 6,393,026 | B1 * | 5/2002 | Irwin ..................... 370/401 |
| 6,393,483 | B1 | 5/2002 | Latif et al. |
| 6,415,338 | B1 | 7/2002 | Habot |
| 6,426,940 | B1 | 7/2002 | Seo et al. |
| 6,427,196 | B1 | 7/2002 | Adiletta et al. |
| 6,430,626 | B1 | 8/2002 | Witkowski et al. |
| 6,434,145 | B1 | 8/2002 | Opsasnick et al. |
| 6,453,404 | B1 | 9/2002 | Bereznyi et al. |
| 6,463,072 | B1 | 10/2002 | Wolrich et al. |
| 6,463,480 | B1 * | 10/2002 | Kikuchi et al. ............ 719/315 |
| 6,463,527 | B1 * | 10/2002 | Vishkin ................. 718/108 |
| 6,466,898 | B1 * | 10/2002 | Chan ..................... 703/17 |
| 6,529,983 | B1 | 3/2003 | Marshall et al. |
| 6,532,509 | B1 | 3/2003 | Wolrich et al. |
| 6,535,878 | B1 * | 3/2003 | Guedalia et al. ............ 707/8 |
| 6,552,826 | B1 | 4/2003 | Adler et al. |
| 6,560,667 | B1 | 5/2003 | Wolrich et al. |
| 6,577,542 | B1 | 6/2003 | Wolrich et al. |
| 6,584,522 | B1 | 6/2003 | Wolrich et al. |
| 6,587,906 | B1 | 7/2003 | Wolrich et al. |
| 6,604,125 | B1 | 8/2003 | Belkin |
| 6,606,704 | B1 | 8/2003 | Adiletta et al. |
| 6,625,654 | B1 * | 9/2003 | Wolrich et al. ............ 709/230 |
| 6,631,430 | B1 | 10/2003 | Wolrich et al. |
| 6,631,462 | B1 | 10/2003 | Wolrich et al. |
| 6,661,794 | B1 | 12/2003 | Wolrich et al. |
| 6,667,920 | B1 | 12/2003 | Wolrich et al. |
| 6,668,317 | B1 | 12/2003 | Bernstein et al. |
| 6,671,827 | B1 * | 12/2003 | Guilford et al. ............ 714/38 |
| 6,681,300 | B1 | 1/2004 | Wolrich et al. |
| 6,694,380 | B1 | 2/2004 | Wolrich et al. |
| 6,792,488 | B1 | 9/2004 | Wolrich et al. |
| 6,934,951 | B1 * | 8/2005 | Wilkinson et al. .......... 718/107 |
| 6,944,850 | B1 * | 9/2005 | Hooper et al. ............ 717/129 |
| 6,952,824 | B1 * | 10/2005 | Hooper et al. ............ 718/100 |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 809 180 | 11/1997 |
| JP | 5911133 | 6/1984 |
| WO | WO 94/15287 | 7/1994 |
| WO | WO 97/38372 | 10/1997 |
| WO | WO 01/15718 | 3/2001 |
| WO | WO 01/16769 | 3/2001 |
| WO | WO 01/16770 | 3/2001 |
| WO | WO 01/16782 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |

OTHER PUBLICATIONS

"Nomadic Threads: A migrating multithread approach to remote memory accesses in multiprocessors", by Jenks, S.; Gaudiot, J.L. (abstract only) Publication Date: Oct. 20-23, 1996.

"Overview of the START (*T) multithreaded computer" by Beckeerie, M.J. (abstract only) Publication Date: Feb. 22-26, 1993.

A. Ippoliti, et al., "Parallel Media Access Controller for Packet Communications at Gb/s Rates", 1990, IEEE, pp. 991-996.

Howard Frazier, "Gigabit Ethernet: From 100 to 1,000 Mbps", 1999, IEEE Internet Computing, pp. 24-31.

Howard Frazier, "The 802.3z Gigabit Ethernet Standard", 1998, IEEE Network, pp. 6-7.

U.S. Appl. No. 10/726,757, filed Dec. 3, 2003, Wolrich et al.

U.S. Appl. No. 10/684,078, filed Oct. 10, 2003, Wolrich et al.

U.S. Appl. No. 10/664,202, filed Sep. 16, 2003, Wolrich et al.

U.S. Appl. No. 10/644,337, filed Aug. 20, 2003, Wolrich et al.

U.S. Appl. No. 10/643,438, filed Aug. 19, 2003, Bernstein et al.

U.S. Appl. No. 10/615,500, filed Jul. 8, 2003. Adiletta

U.S. Appl. No. 10/440,079, filed May 15, 2003, Wolrich et al.

U.S. Appl. No. 10/208,264, filed Jul. 30, 2002, Adiletta et al.

U.S. Appl. No. 09/476,303, filed Dec. 30, 1999, Wolrich et al.

U.S. Appl. No. 09/475,614, filed Dec. 30, 1999, Wolrich et al.

U.S. Appl. No. 09/473,571, filed Dec. 28, 1999, Wolrich et al.

U.S. Appl. No. 09/387,109, filed Aug. 31, 1999, Adiletta et al.

Byrd et al., "Multithread Processor Architectures," *IEEE Spectrum*, vol. 32, No. 8, New York, Aug. 1, 1995, pp. 38-46.

Doyle et al., *Microsoft Press Computer Dictionary*, $2^{nd}$ ed., Microsoft Press, Redmond, Washington, USA, 1994, p. 326.

Fillo et al., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the $5^{th}$ Annual IEEE Symposium on Field-Programmable Custom Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the $28^{th}$ Annual Hawaii International Conference on System Sciences, 1995, pp. 191-201.

Trimberger et al, "A time-multiplexed FPGA," Proceedings of the $5^{th}$ Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wazlowski et al., "PRSIM-II computer and architecture," IEEE Proceedings, Workshop on FPGAs for Custom Computing Machines, 1993.

"Imagine: Media Processing with Streams," B. Khailany et al., IEEE Micro, Mar.-Apr. 2001, pp. 35-46.

* cited by examiner

T_Cmd_type_
R<2:0>
000 : Bus Idle
001 : SDRAM
010 : SRAM
011 : SRAM-csr
100 : PCI
101 : Reserved
110 : FBI
111 : Scratch Pull Engine
Cmd Arbitration:
1) Amba
2) Hash
3) Pull Cmds Push Engine
Cmd Arbitration:
1) Amba
2) Hash
 Completion
3) Push Cmds Sdram_puXX_addr_R<6:0>
[4:0] xfer_reg_addr
if not TFIFO
[6:0] TFIFO_addr Sdram_puXX_ID_R<3:0>
0-5 Fboxes
8-13 Fboxes_csr
6 fbi
15 nop Sram_puXX_addr_R<4:0>
[4:0] xfer_reg_addr Sram_puXX_ID_R<3:0>
0-5 Fboxes
8-13 Fboxes_csr
6 fbi
15 nop Cmd_Req_R<2:0>
000 none
001 Sram Chain
010 SDR Chain
011 Sram
100 SDR
101 FBI
110 PCI
111

Tx_CMD_drv_en_
R<1:0>
0 none
1 grant

ATU Notes:
a) Core to FboxRegs:
use sram_push_data_bus
b) Core to FBI Regs:
use Private ATU/FBI
cmd/data bus
c) Core reads FboxRegs:
use Sram_pull_data_bus
d) Core Reads FBIRegs:
use sram_push_data_bus
(makes sram appear like
another Fbox to FBI or
sram_push_bus)

Fbox Branch/Ctx Choices:
1) FBI_sdone                          br/ctx
2) FBI_auto_push                      br/ctx
3) lthread_sdone                      br/ctx
4) signal_rec_ctl                     br/ctx
5) Seq #1_change        (flag) br/ctx
6) Seq #2_change        (flag) br/ctx
7) SRAM_sdone                         br/ctx
8) SDRAM_sdone                        br/ctx
9) volunteer_ctx_swap                 ctx
10) Rec_req_available   (flag) br
11) SDRAM rd parity err        br
12) Fbox_push_protect   (flag) br
13) ccodes, contexts and kill

FIG. 6D

THREAD SIGNALING IN MULTI-THREADED PROCESSOR

This application is a continuation of, and claims priority to, U.S. patent application Ser. No. 09/473,799, filed Dec. 28, 1999 now U.S. Pat. No. 6,625,654, and entitled "THREAD SIGNALING IN MULTI-THREADED NETWORK PROCESSOR".

BACKGROUND

This invention relates to network packet processing.

Parallel processing is an efficient form of information processing of concurrent events in a computing process. Parallel processing demands concurrent execution of many programs in a computer, in contrast to sequential processing. In the context of a parallel processor, parallelism involves doing more than one thing at the same time. Unlike a serial paradigm where all tasks are performed sequentially at a single station or a pipelined machine where tasks are performed at specialized stations, with parallel processing, a plurality of stations are provided with each capable of performing all tasks. That is, in general all or a plurality of the stations work simultaneously and independently on the same or common elements of a problem. Certain problems are suitable for solution by applying parallel processing.

SUMMARY

According to an aspect of the present invention, a method for processing of network packets includes receiving network packets and operating on the network packets with a plurality of program threads to affect processing of the packets.

BRIEF DESCRIPTION OF THE DRAWINGS

FIGS. 6A–6D are a block diagram of a communication bus interface in the processor of FIG. 1 depicting hardware used in program thread signaling.

DESCRIPTION

Architecture

Figure 1:
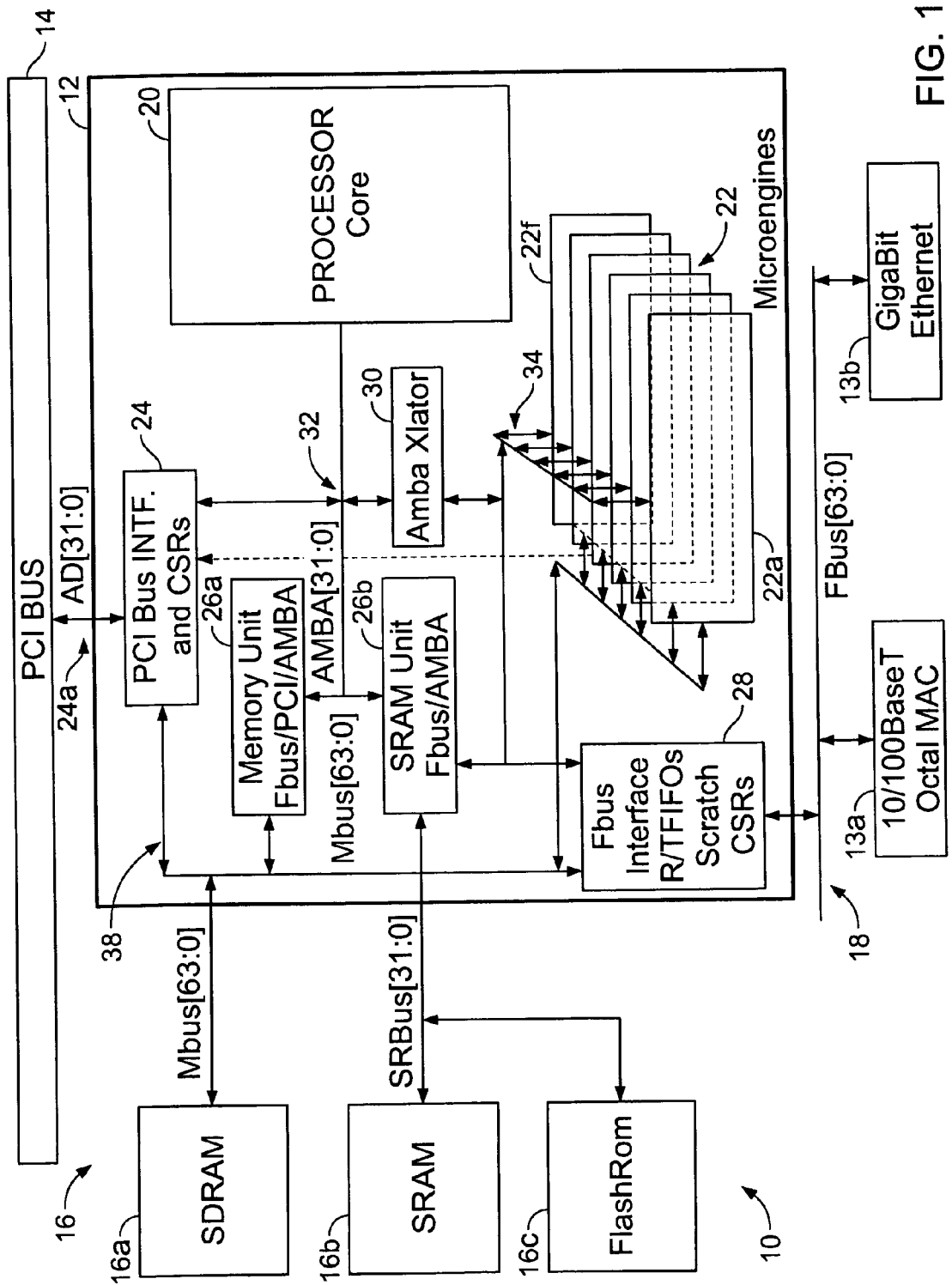
FIG. 1 is a block diagram of a communication system employing a hardware-based multithreaded processor.
Figure 2A:
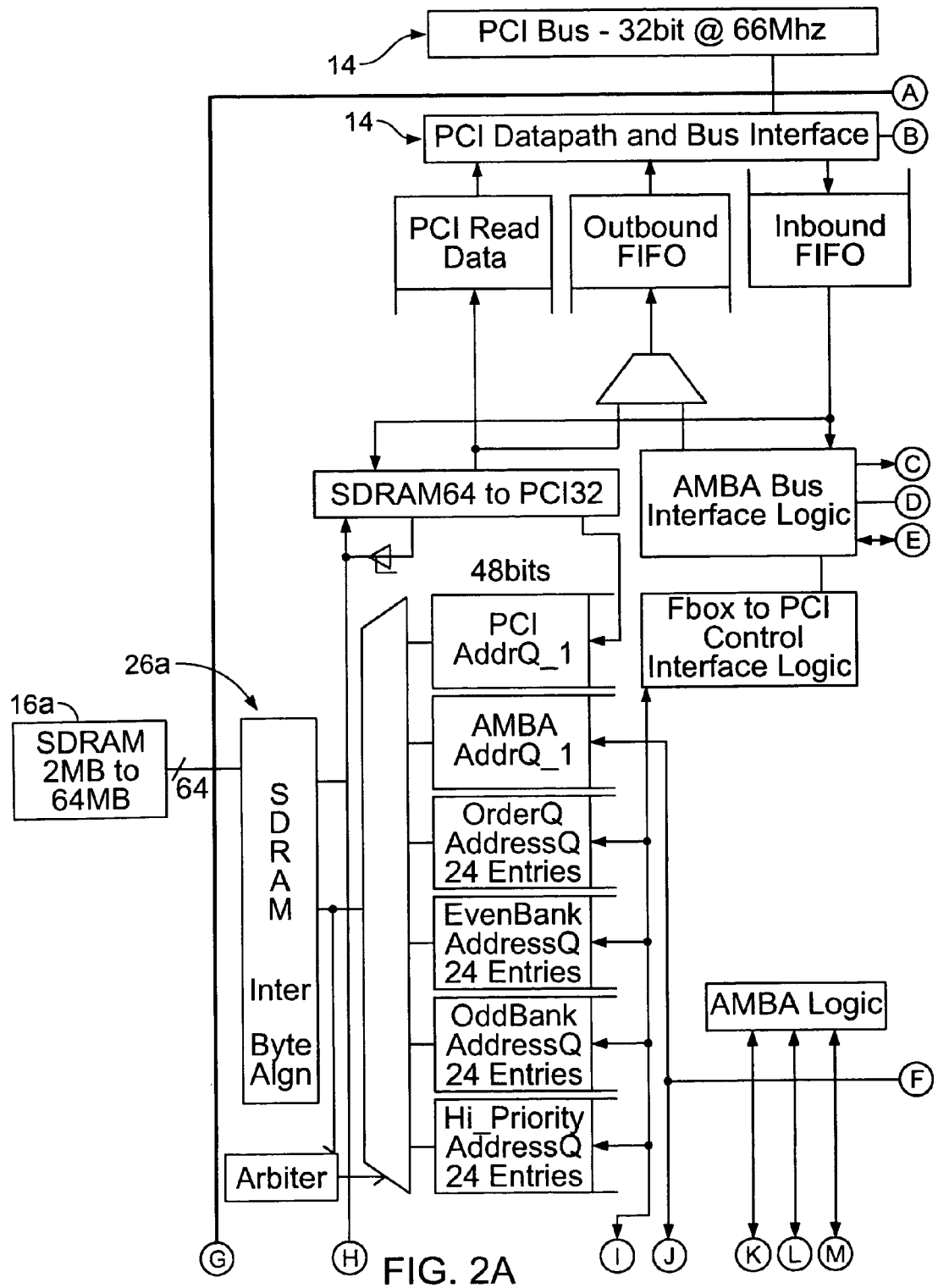
FIGS. 2A–2D are a detailed block diagram of the hardware-based multithreaded processor of FIG. 1.
Figure 2B:
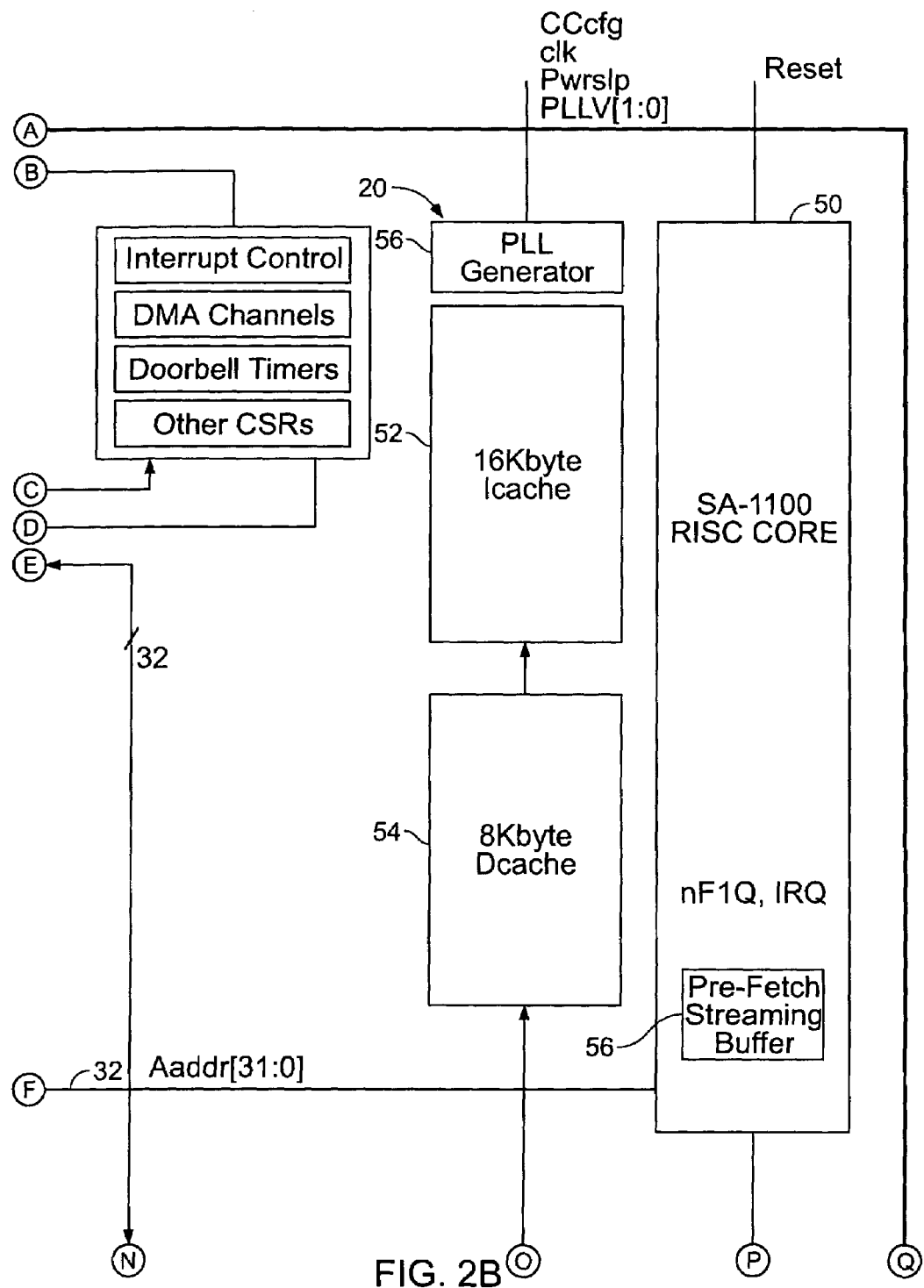
Figure 2C:
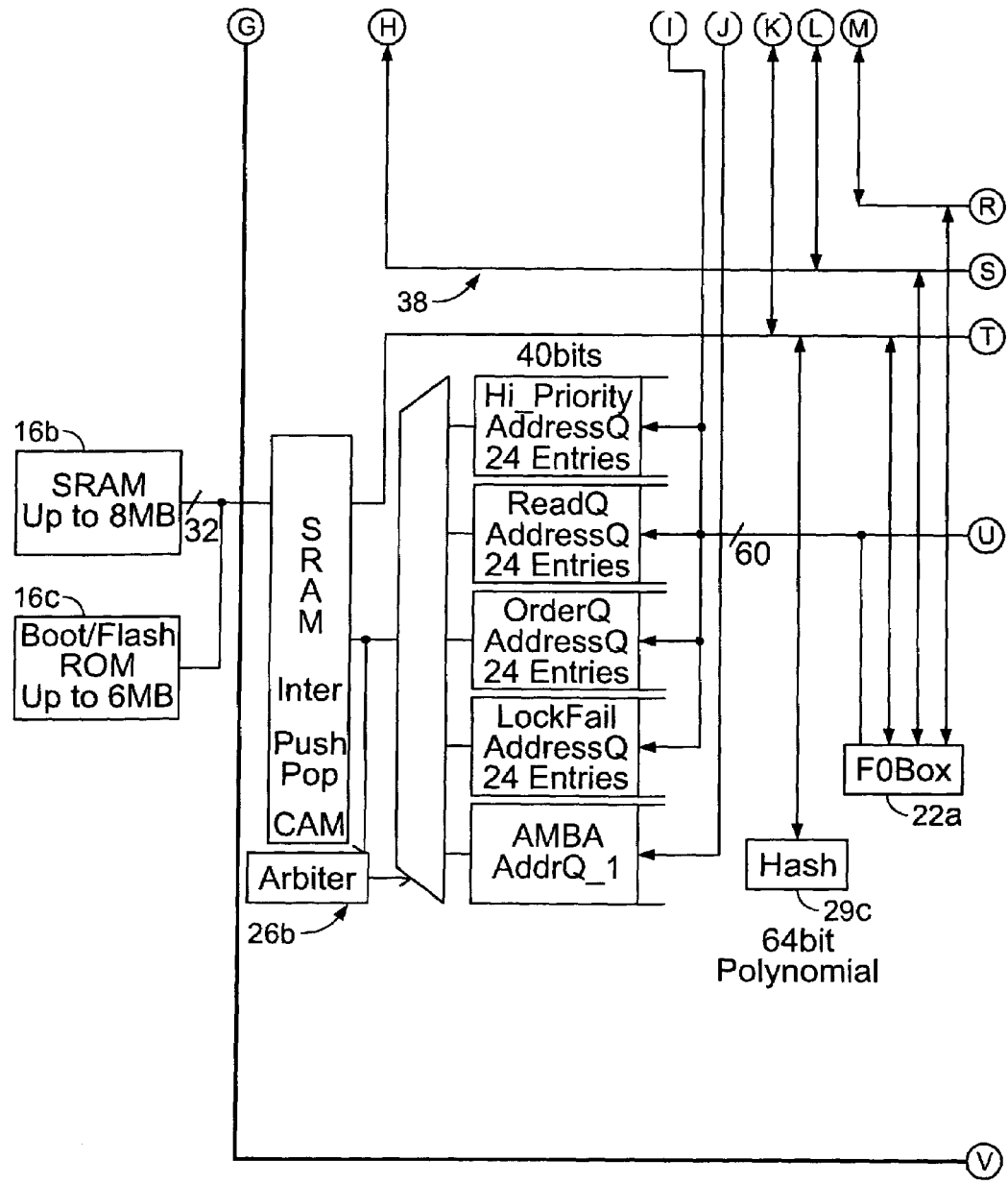
Figure 2D:
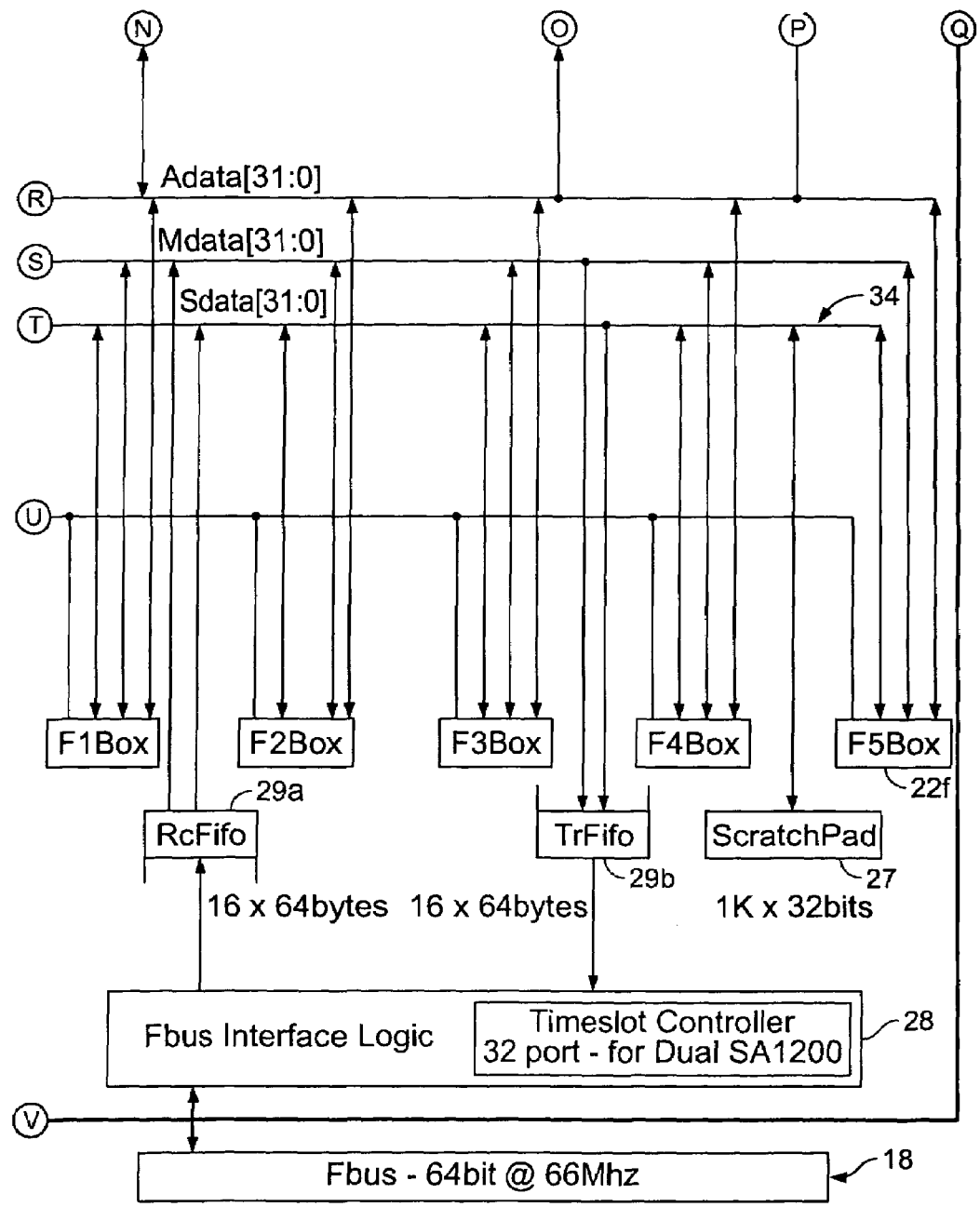

Referring to FIG. 1, a communication system 10 includes a parallel, hardware-based multithreaded processor 12. The hardware-based multithreaded processor 12 is coupled to a bus such as a Peripheral Component Interconnect (PCI) bus 14, a memory system 16 and a second bus 18. The system 10 is especially useful for tasks that can be broken into parallel subtasks or functions. Specifically hardware-based multithreaded processor 12 is useful for tasks that are bandwidth oriented rather than latency oriented. The hardware-based multithreaded processor 12 has multiple microengines 22 each with multiple hardware controlled program threads that can be simultaneously active and independently work on a task.

The hardware-based multithreaded processor 12 also includes a central controller 20 that assists in loading microcode control for other resources of the hardware-based multithreaded processor 12 and performs other general purpose computer type functions such as handling protocols, exceptions, extra support for packet processing where the microengines pass the packets off for more detailed processing such as in boundary conditions. In one embodiment, the processor 20 is a Strong Arm® (Arm is a trademark of ARM Limited, United Kingdom) based architecture. The general purpose microprocessor 20 has an operating system. Through the operating system the processor 20 can call functions to operate on microengines 22a–22f. The processor 20 can use any supported operating system preferably a real time operating system. For the core processor implemented as a Strong Arm architecture, operating systems such as, Microsoft NT real-time, VXworks and µCUS, a freeware operating system available over the Internet, can be used.

The hardware-based multithreaded processor 12 also includes a plurality of microengines 22a–22f. Microengines 22a–22f each maintain a plurality of program counters in hardware and states associated with the program counters. Effectively, a corresponding plurality of sets of program threads can be simultaneously active on each of the microengines 22a–22f while only one is actually operating at any one time.

In one embodiment, there are six microengines 22a–22f, each having capabilities for processing four hardware program threads. The six microengines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

Hardware context swapping enables other contexts with unique program counters to execute in the same microengine. Hardware context swapping also synchronizes completion of tasks. For example, two program threads could request the same shared resource e.g., SRAM. Each one of these separate functional units, e.g., the FBUS interface 28, the SRAM controller 26b, and the SDRAM controller 26a, when they complete a requested task from one of the microengine program thread contexts reports back a flag signaling completion of an operation. When the flag is received by the microengine, the microengine can determine which program thread to turn on.

As a network processor, e.g., a router, the hardware-based multithreaded processor 12 interfaces to network devices such as a media access controller device e.g., a 10/100BaseT Octal MAC 13a or a Gigabit Ethernet device 13b. In general, as a network processor, the hardware-based multithreaded processor 12 can interface to any type of communication device or interface that receives/sends large amounts of data. The network processor can function as a router 10 in a networking application route network packets amongst devices 13a, 13b in a parallel manner. With the hardware-based multithreaded processor 12, each network packet can be independently processed.

The processor 12 includes a bus interface 28 that couples the processor to the second bus 18. Bus interface 28 in one embodiment couples the processor 12 to the so-called FBUS 18 (FIFO bus). The FBUS interface 28 is responsible for controlling and interfacing the processor 12 to the FBUS 18. The FBUS 18 is a 64-bit wide FIFO bus, used to interface to Media Access Controller (MAC) devices. The processor 12 includes a second interface e.g., a PCI bus interface 24 that couples other system components that reside on the PCI 14 bus to the processor 12.

The functional units are coupled to one or more internal buses. The internal buses are dual, 32 bit buses (i.e., one bus for read and one for write). The hardware-based multi-threaded processor 12 also is constructed such that the sum of the bandwidths of the internal buses in the processor 12 exceed the bandwidth of external buses coupled to the processor 12. The processor 12 includes an internal core processor bus 32, e.g., an ASB bus (Advanced System Bus) that couples the processor core 20 to the memory controllers 26a, 26b and to an ASB translator 30 described below. The ASB bus is a subset of the so called AMBA bus that is used with the Strong Arm processor core. The processor 12 also includes a private bus 34 that couples the microengine units to SRAM controller 26b, ASB translator 30 and FBUS interface 28. A memory bus 38 couples the memory controller 26a, 26b to the bus interfaces 24 and 28 and memory system 16 including flashrom 16c used for boot operations and so forth.

Referring to FIG. 2, each of the microengines 22a–22f includes an arbiter that examines flags to determine the available program threads to be operated upon. Any program thread from any of the microengines 22a–22f can access the SDRAM controller 26a, SRAM controller 26b or FBUS interface 28. The SDRAM controller 26a and SDRAM controller 26b each include a plurality of queues to store outstanding memory reference requests. The queues either maintain order of memory references or arrange memory references to optimize memory bandwidth.

If the memory subsystem 16 is flooded with memory requests that are independent in nature, the processor 12 can perform memory reference sorting. Memory reference sorting reduces dead time or a bubble that occurs with accesses to SRAM. Memory reference sorting allows the processor 12 to organize references to memory such that long strings of reads can be followed by long strings of writes.

Reference sorting helps maintain parallel hardware context program threads. Reference sorting allows hiding of pre-charges from one SDRAM bank to another. If the memory system 16b is organized into an odd bank and an even bank, while the processor is operating on the odd bank, the memory controller 26b can start precharging the even bank. Precharging is possible if memory references alternate between odd and even banks. By ordering memory references to alternate accesses to opposite banks, the processor 12 improves SDRAM bandwidth. Additionally, other optimizations can be used. For example, merging optimizations where operations that can be merged, are merged prior to memory access, open page optimizations where by examining addresses, an opened page of memory is not reopened, chaining which allows for special handling of contiguous memory references and refreshing mechanisms, can be employed.

The FBUS interface 28 supports Transmit and Receive flags for each port that a MAC device supports, along with an Interrupt flag indicating when service is warranted. The FBUS interface 28 also includes a controller 28a that performs header processing of incoming packets from the FBUS 18. The controller 28a extracts the packet headers and performs a microprogrammable source/destination/protocol hashed lookup (used for address smoothing) in SRAM. If the hash does not successfully resolve, the packet header is sent to the processor core 20 for additional processing. The FBUS interface 28 supports the following internal data transactions:

| FBUS unit | (Shared bus SRAM) | to/from microengine. |
| FBUS unit | (via private bus) | writes from SDRAM Unit. |
| FBUS unit | (via Mbus) | Reads to SDRAM. |

The FBUS 18 is a standard industry bus and includes a data bus, e.g., 64 bits wide and sideband control for address and read/write control. The FBUS interface 28 provides the ability to input large amounts of data using a series of input and output FIFO's 29a–29b. From the FIFOs 29a–29b, the microengines 22a–22f fetch data from or command the SDRAM controller 26a to move data from a receive FIFO in which data has come from a device on bus 18, into the FBUS interface 28. The data can be sent through memory controller 26a to SDRAM memory 16a, via a direct memory access. Similarly, the microengines can move data from the SDRAM 26a to interface 28, out to FBUS 18, via the FBUS interface 28.

Data functions are distributed amongst the microengines. Connectivity to the SRAM 26a, SDRAM 26b and FBUS 28 is via command requests. A command request can be a memory request or a FBUS request. For example, a command request can move data from a register located in a microengine 22a to a shared resource, e.g., an SDRAM location, SRAM location, flash memory or some MAC address. The commands are sent out to each of the functional units and the shared resources. However, the shared resources do not need to maintain local buffering of the data. Rather, the shared resources access distributed data located inside of the microengines. This enables microengines 22a–22f, to have local access to data rather than arbitrating for access on a bus and risk contention for the bus. With this feature, there is a 0 cycle stall for waiting for data internal to the microengines 22a–22f.

The core processor 20 also can access the shared resources. The core processor 20 has a direct communication to the SDRAM controller 26a to the bus interface 24 and to SRAM controller 26b via bus 32. To access the microengines 22a–22f and transfer registers located at any of the microengines 22a–22f, the core processor 20 access the microengines 22a–22f via the ASB Translator 30 over bus 34. The ASB Translator 30 performs an address translation between FBUS microengine transfer register locations and core processor addresses (i.e., ASB bus) so that the core processor 20 can access registers belonging to the microengines 22a–22c.

Although microengines 22 can use the register set to exchange data. A scratchpad memory 27 is also provided to permit microengines to write data out to the memory for other microengines to read. The scratchpad 27 is coupled to bus 34.

Microengines

Figure 3:
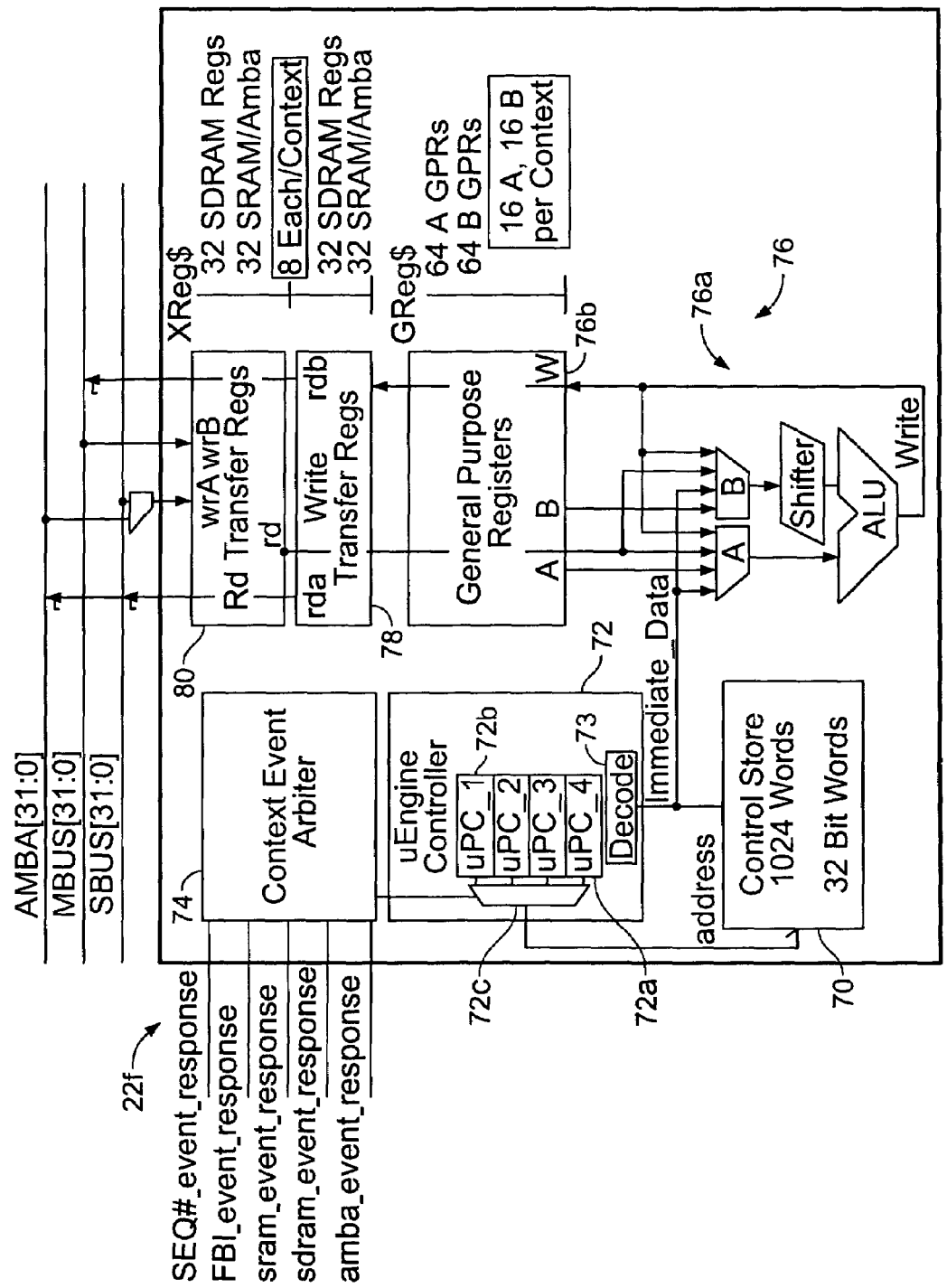
FIG. 3 is a block diagram of a microengine functional unit employed in the hardware-based multithreaded processor of FIGS. 1 and 2.

Referring to FIG. 3, an exemplary one of the microengines 22a–22f, e.g., microengine 22f is shown. The microengine includes a control store 70 which, in one implementation, includes a RAM of here 1,024 words of 32 bits. The RAM stores a microprogram that is loadable by the core processor 20. The microengine 22f also includes controller logic 72. The controller logic includes an instruction decoder 73 and program counter (PC) units 72a–72c. The four micro program counters 72a–72c are maintained in hardware. The microengine 22f also includes context event switching logic 74. Context event logic 74 receives messages (e.g., SEQ_#_EVENT_RESPONSE; FBI_EVENT_RESPONSE; SRAM_EVENT_RESPONSE; SDRAM_EVENT_RESPONSE; and ASB_EVENT_RESPONSE) from each one of the shared resources, e.g., SRAM 26b, SDRAM 26a, or processor core 20, control and status registers, and so forth. These messages provide information on whether a requested function has completed. Based on whether or not a function requested by a program thread has completed and signaled completion, the program thread needs to wait for that completion signal, and if the program thread is enabled to operate, then the program thread is placed on an available program thread list (not shown). The microengine 22f can have a maximum of, e.g., 4 program threads available.

In addition to event signals that are local to an executing program thread, the microengines 22 employ signaling states that are global. With signaling states, an executing program thread can broadcast a signal state to all microengines 22. Any program thread in the microengines can branch on these signaling states. These signaling states can be used to determine availability of a resource or whether a resource is due for servicing.

The context event logic 74 has arbitration for the four (4) program threads. In one embodiment, the arbitration is a round robin mechanism. Other techniques could be used including priority queuing or weighted fair queuing. The microengine 22f also includes an execution box (EBOX) data path 76 that includes an arithmetic logic unit 76a and general purpose register set 76b. The arithmetic logic unit 76a performs arithmetic and logical functions as well as shift functions. The registers set 76b has a relatively large number of general purpose registers. In this implementation there are 64 general purpose registers in a first bank, Bank A and 64 in a second bank, Bank B. The general purpose registers are windowed so that they are relatively and absolutely addressable.

The microengine 22f also includes a write transfer register stack 78 and a read transfer stack 80. These registers are also windowed so that they are relatively and absolutely addressable. Write transfer register stack 78 is where write data to a resource is located. Similarly, read register stack 80 is for return data from a shared resource. Subsequent to or concurrent with data arrival, an event signal from the respective shared resource e.g., the SRAM controller 26a, SDRAM controller 26b or core processor 20 will be provided to context event arbiter 74 which will then alert the program thread that the data is available or has been sent. Both transfer register banks 78 and 80 are connected to the execution box (EBOX) 76 through a data path. In one implementation, the read transfer register has 64 registers and the write transfer register has 64 registers.

Each microengine 22a–22f supports multi-threaded execution of four contexts. One reason for this is to allow one program thread to start executing just after another program thread issues a memory reference and must wait until that reference completes before doing more work. This behavior is critical to maintaining efficient hardware execution of the microengines because memory latency is significant. Stated differently, if only a single program thread execution was supported, the microengines would sit idle for a significant number of cycles waiting for references to return and thereby reduce overall computational throughput. Multi-threaded execution allows an microengines to hide memory latency by performing useful independent work across several program threads. Two synchronization mechanisms are supplied in order to allow a program thread to issue an SRAM or SDRAM reference, and then subsequently synchronize to the point in time when that reference completes.

One mechanism is Immediate Synchronization. In immediate synchronization, the microengine issues the reference and immediately swaps out of that context. The context will be signaled when the corresponding reference completes. Once signaled, the context will be swapped back in for execution when a context-swap event occurs and it is its turn to run. Thus, from the point of view of a single context's instruction stream, the microword after issuing the mem reference does not get executed until the reference completes.

A second mechanism is Delayed Synchronization. In delayed synchronization, the microengine issues the reference, and continues to execute some other useful work independent of the reference. Some time later it could become necessary to synchronize the program thread's execution stream to the completion of the issued reference before further work is performed. At this point a synchronizing microword is executed that will either swap out the current program thread, and swap it back in sometime later when the reference has completed, or continue executing the current program thread because the reference has already completed. Delayed synchronization is implemented using two different signaling schemes:

If the memory reference is associated with a transfer register, the signal from which the program thread is triggered is generated when the corresponding transfer register valid bit is set or cleared. For example, an SRAM read which deposits data into transfer register A would be signaled when the valid bit for A is set. If the memory reference is associated with the transfer FIFO or the receive FIFO, instead of a transfer register, then the signal is generated when the reference completes in the SDRAM controller 26a. Only one signal state per context is held in the microengines scheduler, thus only one outstanding signal can exist in this scheme.

Figure 4A:
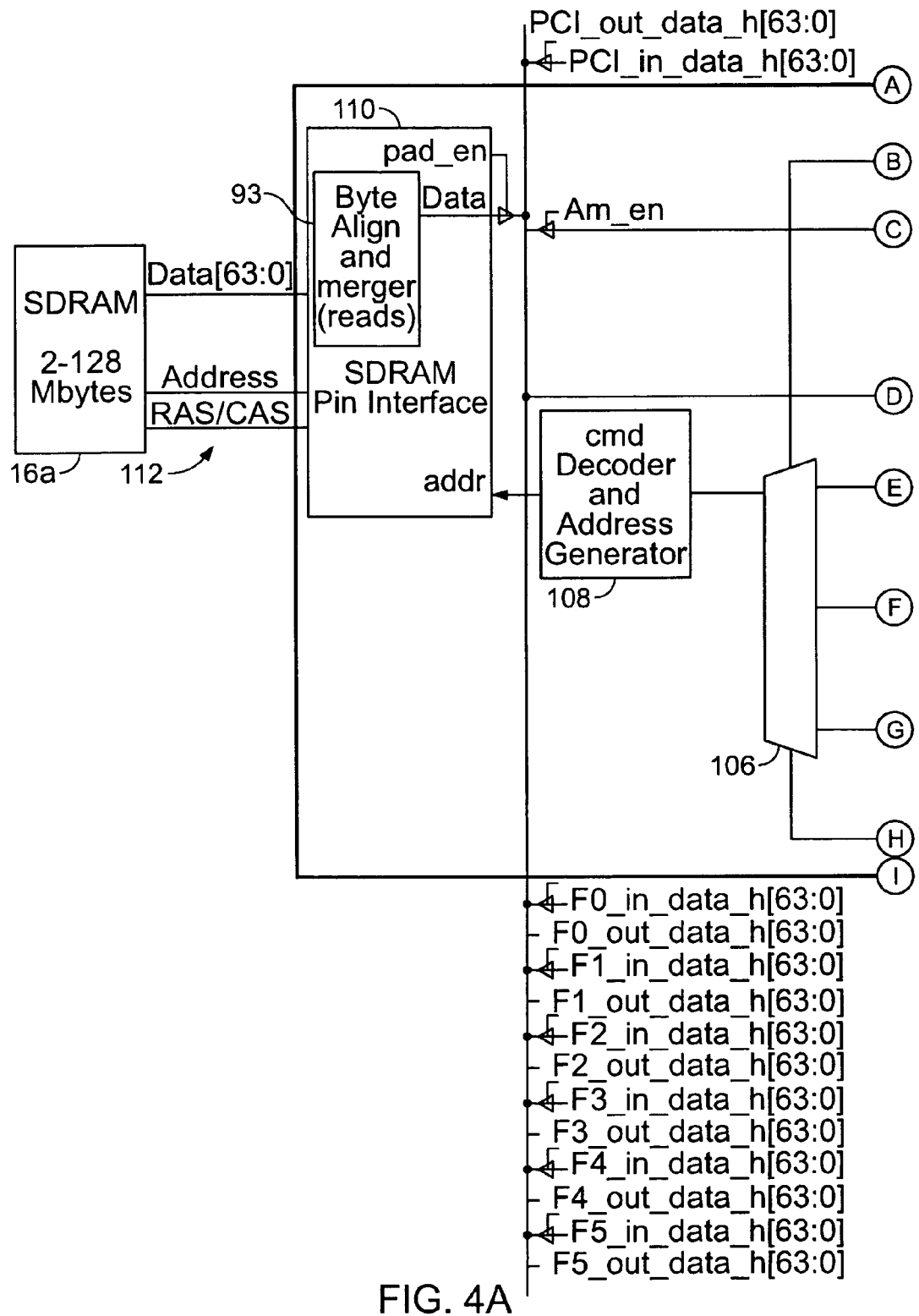
FIGS. 4A–4B are a block diagram of a memory controller for enhanced bandwidth operation used in the hardware-based multithreaded processor.
Figure 4B:
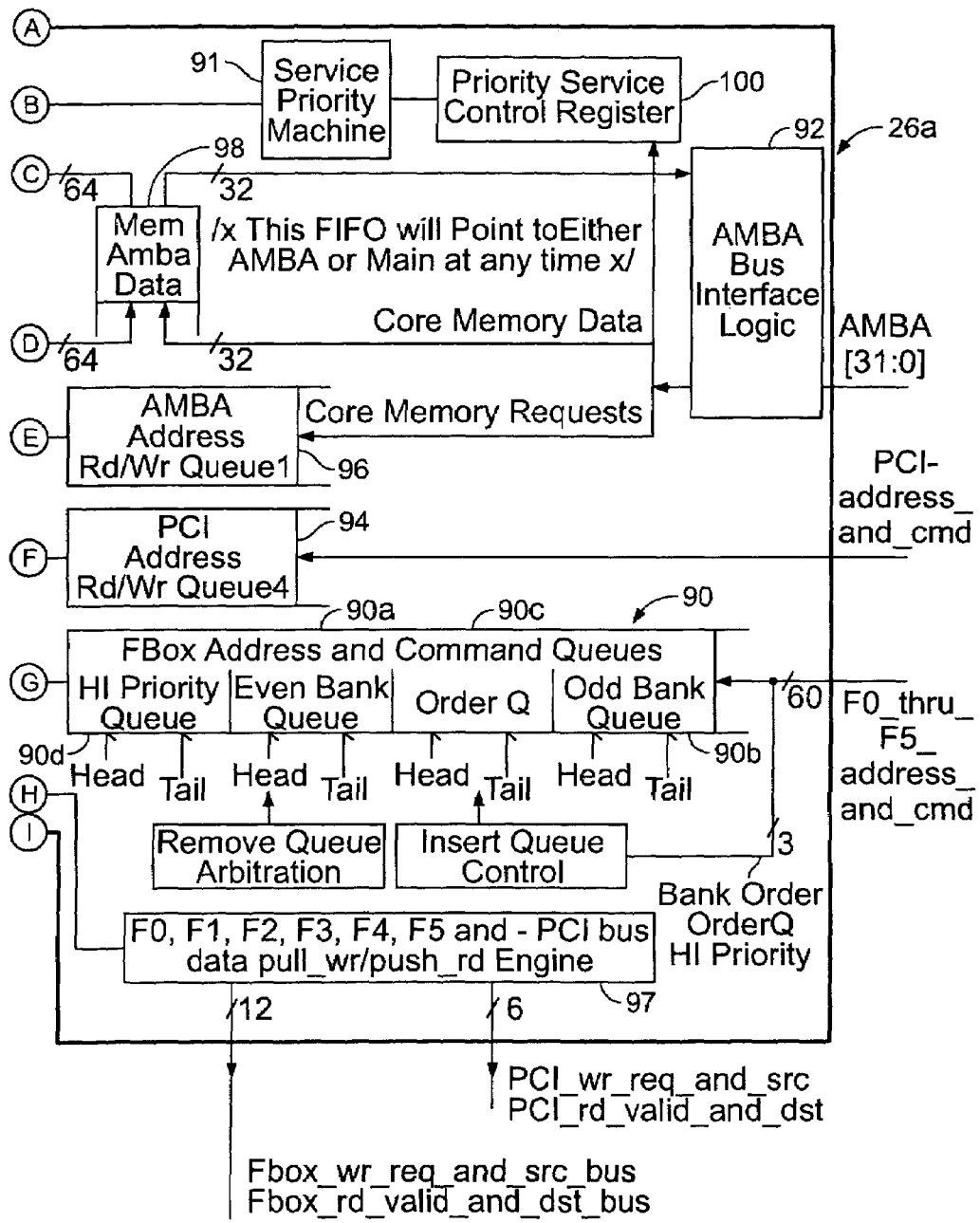

Referring to FIG. 4, the SDRAM memory controller 26a includes memory reference queues 90 where memory reference requests arrive from the various microengines 22a–22f. The memory controller 26a includes an arbiter 91 that selects the next the microengine reference requests to go to any of the functioning units. Given that one of the microengines is providing a reference request, the reference request will come through the address and command queue 90, inside the SDRAM controller 26a. If the reference request has a bit set called the "optimized MEM bit" the incoming reference request will be sorted into either the even bank queue 90a or the odd bank queue 90b. If the memory reference request does not have a memory optimization bit set, the default will be to go into an order queue

90c. The SDRAM controller 26 is a resource which is shared among the FBUS interface 28, the core processor 20 and the PCI interface 24. The SDRAM controller 26 also maintains a state machine for performing READ-MODIFY-Write atomic operations. The SDRAM controller 26 also performs byte alignment for requests of data from SDRAM.

The order queue 90c maintains the order of reference requests from the microengines. With a series of odd and even banks references it may be required that a signal is returned only upon completion of a sequence of memory references to both the odd and even banks. If the microengine 22f sorts the memory references into odd bank and even bank references and one of the banks, e.g., the even bank is drained of memory references before the odd bank but the signal is asserted on the last even reference, the memory controller 26a could conceivably signal back to a microengine that the memory request had completed, even though the odd bank reference had not been serviced. This occurrence could cause a coherency problem. The order queue 90c allows a microengine to have multiple memory references outstanding of which only its last memory reference needs to signal a completion.

The SDRAM controller 26a also includes a high priority queue 90d. In the high priority queue 90d, an incoming memory reference from one of the microengines goes directly to the high priority queue and is operated upon at a higher priority than other memory references in the other queues. All of these queues, the even bank queue 90a, the odd bank queue 90b, the order queue 90c and the high priority queue, are implemented in a single RAM structure that is logically segmented into four different windows, each window having its own head and tail pointer. Since filling and draining operations are only a single input and a single output, they can be placed into the same RAM structure to increase density of RAM structures.

The SDRAM controller 26a also includes core bus interface logic i.e., ASB bus 92. The ASB bus interface logic 92 interfaces the core processor 20 to the SDRAM controller 26a. If there is incoming data from the core processor 20 via ASB interface 92, the data can be stored into the MEM ASB device 98 and subsequently removed from MEM ASB device 98 through the SDRAM interface 110 to SDRAM memory 16a. Although not shown, the same queue structure can be provided for the reads. The SDRAM controller 26a also includes an engine 97 to pull data from the microengines and PCI bus.

Additional queues include the PCI address queue 94 and ASB read/write queue 96 that maintain a number of requests. The memory requests are sent to SDRAM interface 110 via multiplexer 106. The multiplexer 106 is controlled by the SDRAM arbiter 91 which detects the fullness of each of the queues and the status of the requests and from that decides priority based on a programmable value stored in a priority service control register 100.

Figure 5A:
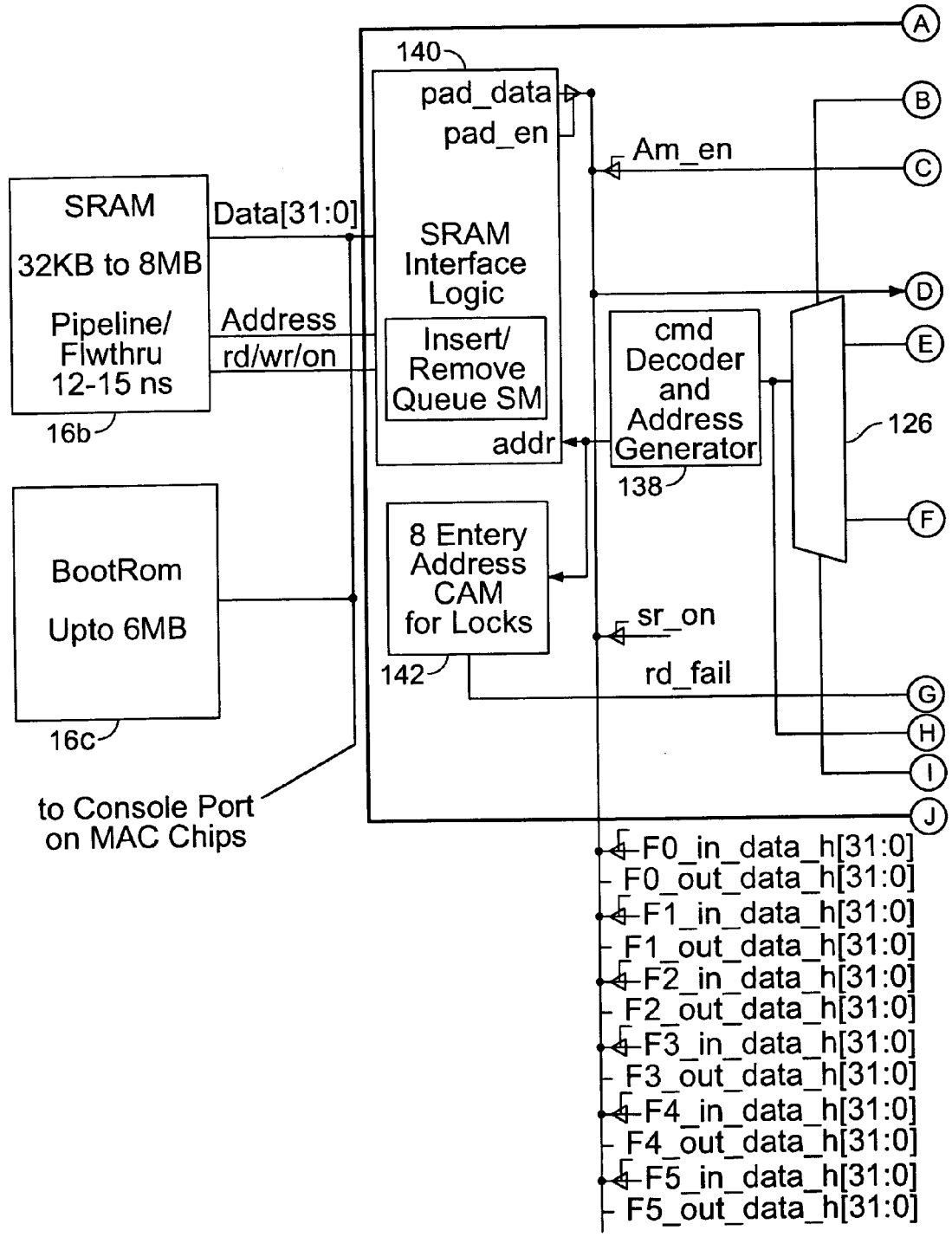
FIGS. 5A–5B are a block diagram of a memory controller for latency limited operations used in the hardware-based multithreaded processor.
Figure 5B:
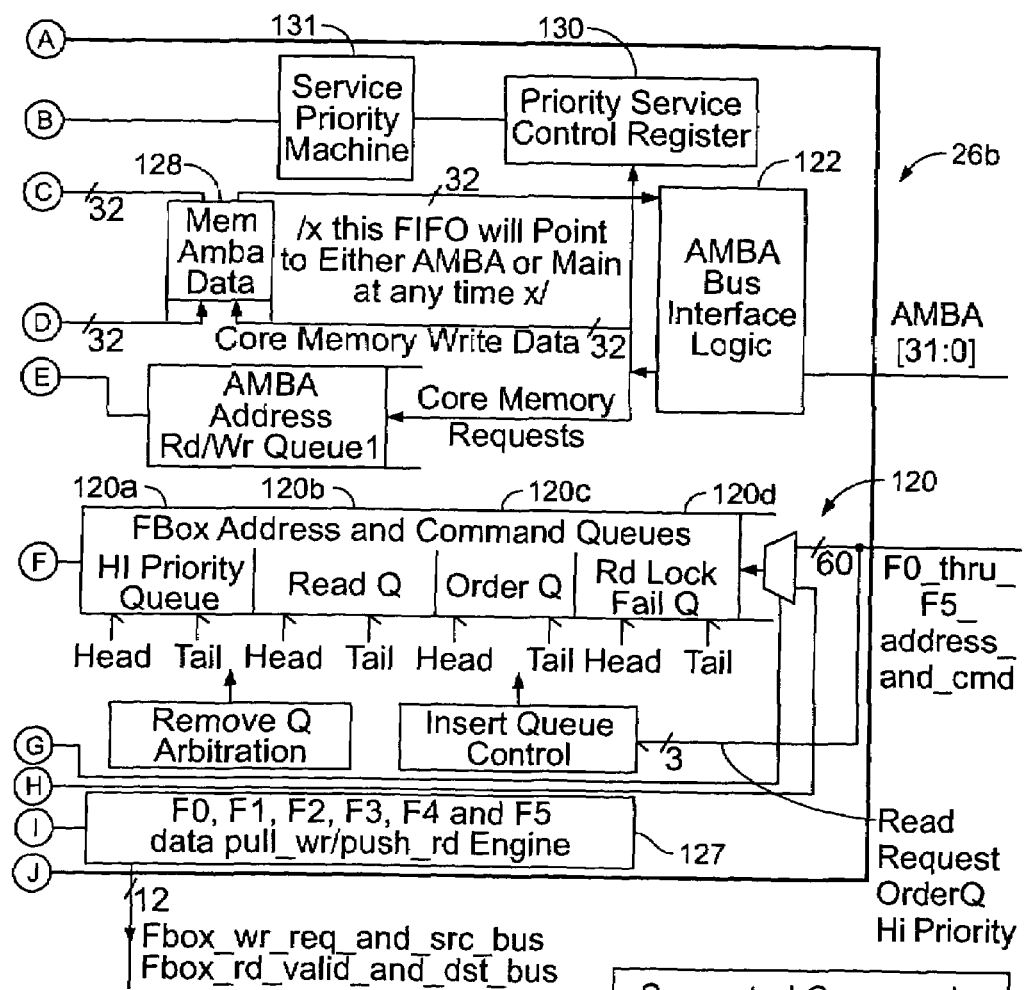

Referring to FIG. 5, the memory controller 26b for the SRAM is shown. The memory controller 26b includes an address and command queue 120. The memory controller 26b is optimized based on the type of memory operation, i.e., a read or a write. The address and command queue 120 includes a high priority queue 120a, a read queue 120b which is the predominant memory reference function that an SRAM performs, and an order queue 120c which in general will include all writes to SRAM and reads that are to be non-optimized. Although not shown, the address and command queue 120 could also include a write queue.

The SRAM controller 26b also includes core bus interface logic i.e., ASB bus 122. The ASB bus interface logic 122 interfaces the core processor 20 to the SRAM controller 26b. The SRAM controller 26b also includes an engine 127 to pull data from the microengines and PCI bus.

The memory requests are sent to SRAM interface 140 via multiplexer 126. The multiplexer 126 is controlled by the SRAM arbiter 131 which detects the fullness of each of the queues and the status of the requests and from that decides priority based on a programmable value stored in a priority service control register 130. Once control to the multiplexer 126 selects a memory reference request, the memory reference request, is sent to a decoder 138 where it is decoded and an address is generated.

The SRAM Unit maintains control of the Memory Mapped off-chip SRAM and Expansion ROM. The SRAM controller 26b can address, e.g., 16 MBytes, with, e.g., 8 MBytes mapped for SRAM 16b, and 8 MBytes reserved for special functions including: Boot space via flashrom 16c; and Console port access for MAC devices 13a, 13b and access to associated (RMON) counters. The SRAM is used for local look-up tables and queue management functions.

The SRAM controller 26b supports the following transactions:

| | | |
|---|---|---|
| Microengine requests | (via private bus) | to/from SRAM. |
| Core Processor | (via ASB bus) | to/from SRAM. |

The address and command queue 120 also includes a Read Lock Fail Queue 120d. The Read Lock Fail Queue 120d is used to hold read memory reference requests that fail because of a lock existing on a portion of memory.

Figure 6A:
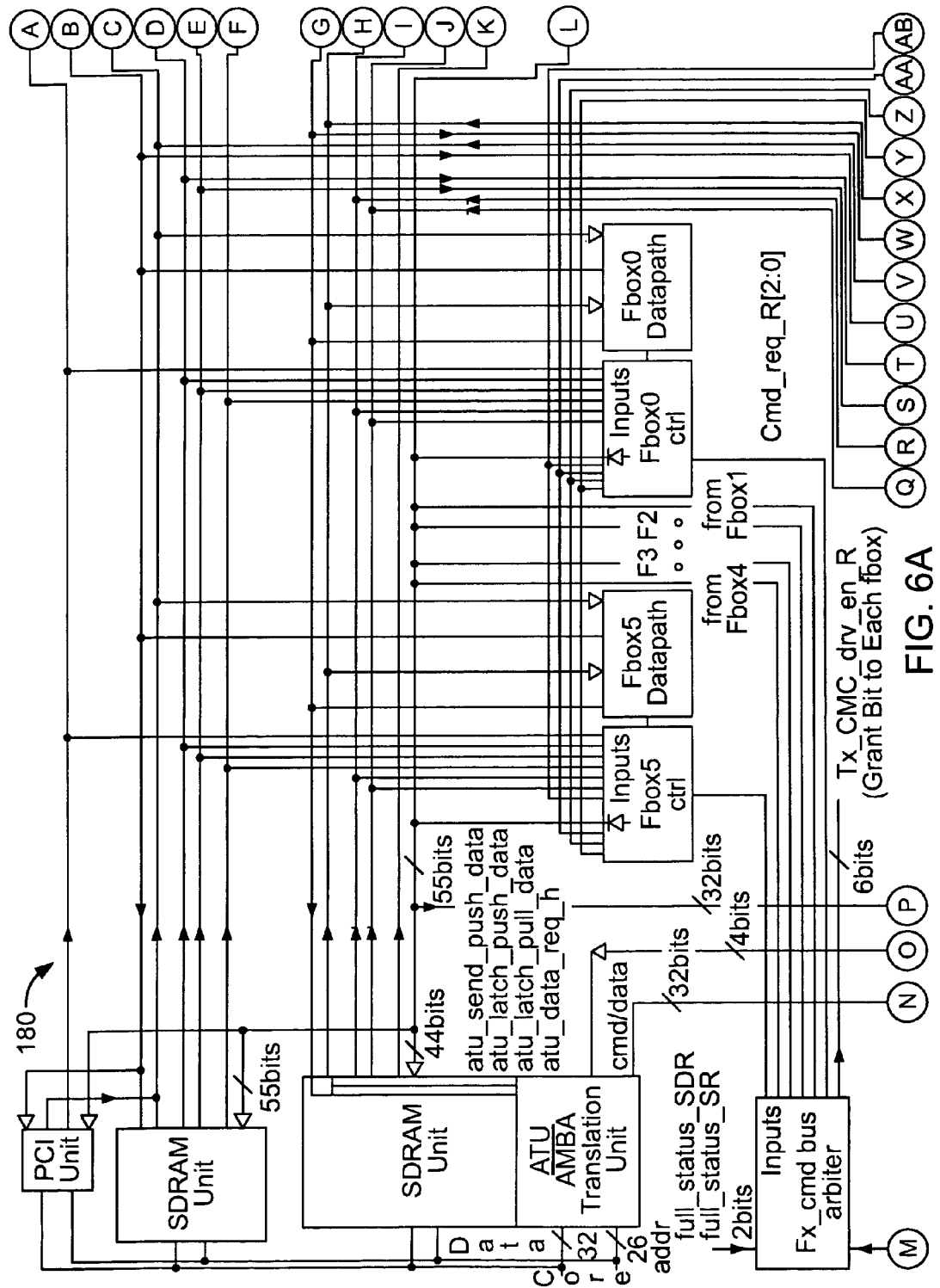
Figure 6B:
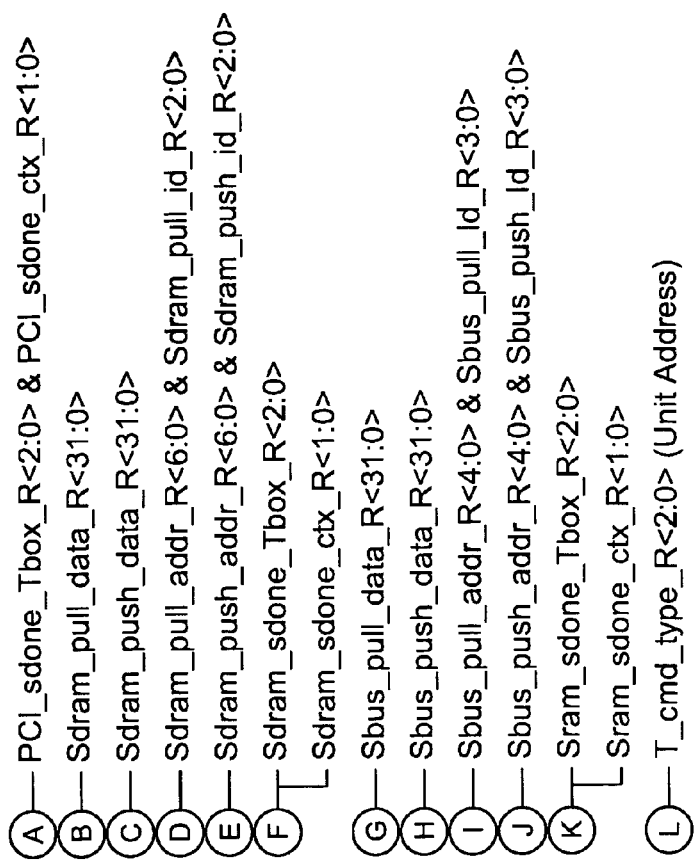
Figure 6C:
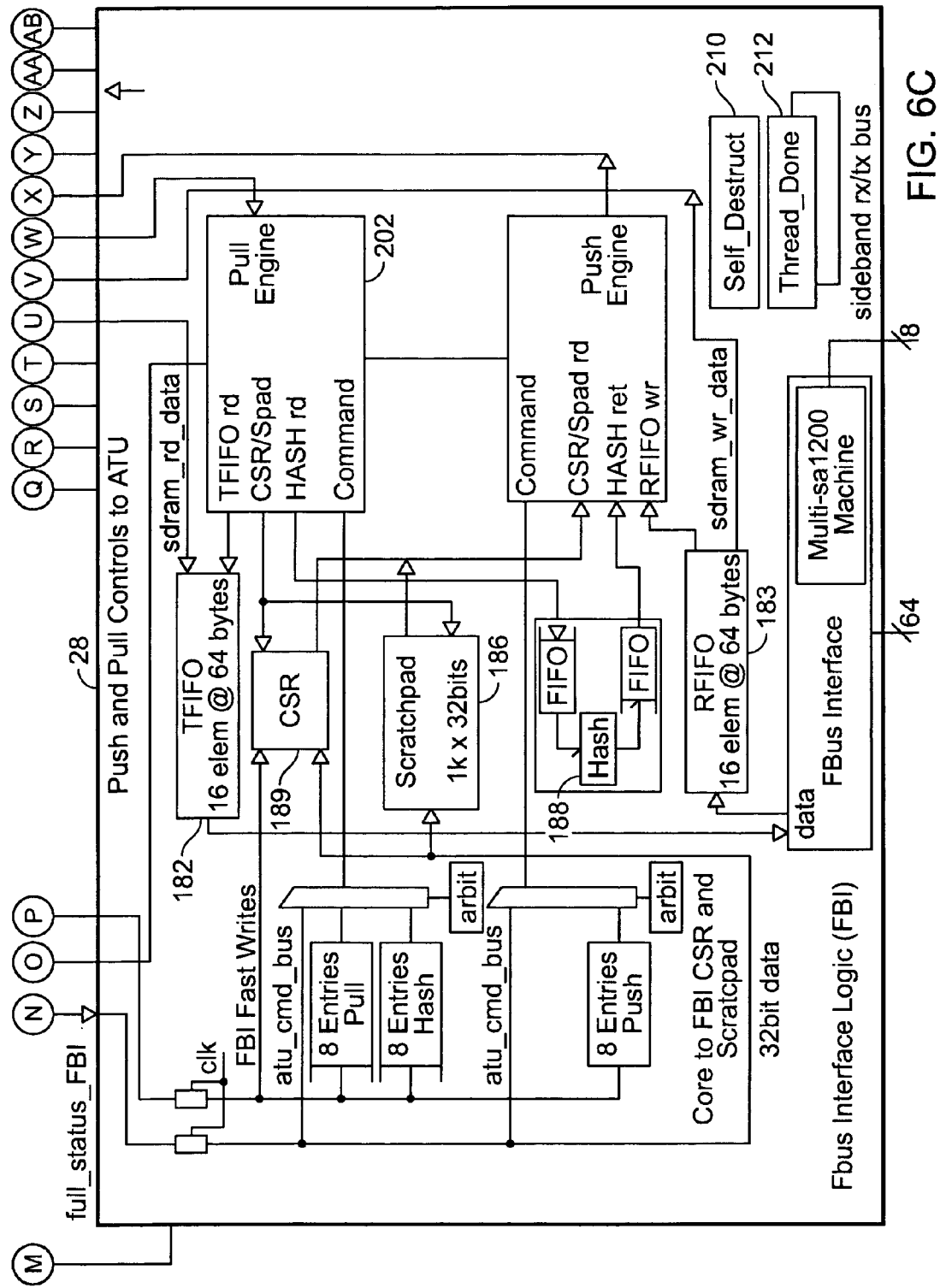

Referring to FIG. 6, communication between the microengines 22 and the FBUS interface Logic (FBI) is shown. The FBUS interface 28 in a network application can performs header processing of incoming packets from the FBUS 18. A key function which the FBUS interface performs is extraction of packet headers, and a microprogrammable source/destination/protocol hashed lookup in SRAM. If the hash does not successfully resolve, the packet header is promoted to the core processor 28 for more sophisticated processing.

The FBI 28 contains a Transmit FIFO 182, a Receive FIFO 183, a HASH unit 188 and FBI control and status registers 189. These four units communicate with the microengines 22, via a time-multiplexed access to the SRAM bus 38 which is connected to the transfer registers 78, 80 in the microengines. That is, all communications to and from the microengines are via the transfer registers 78, 80. The FBUS interface 28 includes a push state machine 200 for pushing data into the transfer registers during the time cycles which the SRAM is NOT using the SRAM data bus (part of bus 38) and a pull state machine 202 for fetching data from the transfer registers in the respective microengine.

The Hashing unit includes a pair of FIFO's 188a, 188b. The hash unit determines that the FBI 28 received an FBI_hash request. The hash unit 188 fetches hash keys from the calling microengine 22. After the keys are fetched and hashed, the indices are delivered back to the calling microengine 22. Up to three hashes are performed under a single FBI_hash request. The busses 34 and 38 are each unidirectional: SDRAM_push/pull_data, and Sbus_push/pull_data. Each of these busses require control signals which will provide read/write controls to the appropriate microengine 22 Transfer registers.

Generally, transfer registers require protection from the context controlling them to guarantee read correctness. In particular, if a write transfer register is being used by a thread_1 to provide data to the SDRAM 16a, thread_1 does not overwrite this register until the signal back from SDRAM controller 26a indicates that this register has been promoted and may now be re-used. Every write does not require a signal back from the destination indicating that the function has been completed, because if the program thread writes to the same command queue at that destination with multiple requests, the order of the completion is guaranteed within that command queue, thus only the last command requires the signaling back to the program thread. However, if the program thread uses multiple command queues (order and read), then these command requests are broken into separate context tasks, so that ordering is maintained via context swapping. The exception case indicated at the beginning of this paragraph is relative to a certain class of operations using an unsolicited PUSH to transfer registers from the FBI for FBUS status information. In order to protect read/write determinism on the transfer registers, the FBI provides a special Push_protect signal when these special FBI push operations are set up.

Any microengine 22 that uses the FBI unsolicited push technique must test the protection flag prior to accessing the FBUS interface/microengine agreed upon transfer registers. If the flag is not asserted, then the transfer registers may be accessed by the microengines 22. If the flag is asserted then the context should wait N cycles prior to accessing the registers. This count is determined a priori by the number of transfer registers being pushed, plus a frontend protection window. The microengine tests this flag then moves the data from the read transfer registers to GPR's in contiguous cycles, so the push engine does not collide with the microengine read.

Thread Signaling for Packet Processing

Special techniques such as inter-thread communications to communicate status, a self destruct register 210 to allow program threads to self assign tasks and a thread_done register 212 to provide a global program thread communication scheme are used for packet processing. The destruct register 210 and a thread_done register 212 can be implemented as control and status registers 189. They are shown in the FBUS interface 28 outside of the block labeled CSR for clarity. Network functions are implemented in the network processor using a plurality of program threads e.g., contexts to process network packets. For example, scheduler program threads could be executed in one of the microprogram engines e.g., 22a whereas, processing program threads could execute in the remaining engines e.g., 22b–22f. The program threads (processing or scheduling program threads) use inter-thread communications to communicate status.

Program threads are assigned specific tasks such as receive and transmit scheduling, receive processing, and transmit processing, etc. Task assignment and task completion are communicated between program threads through the inter-thread signaling, registers with specialized read and write. characteristics, e.g., the self-destruct register 210 and the thread-done register 212, SRAM 16b and data stored in the internal scratchpad memory 186 (FIG. 6) resulting from operations such as bit set, and bit clear.

The network processor 10 includes a general context communication signaling protocol that allows any context to set a signal that any other context can detect. This allows cooperating program threads to use a semaphore and thus coordinate using micro-code controlled processing.

Processing of network packets can use multiple program threads. Typically, for network processing there is a receive scheduler, a transmit scheduler and processing program threads. A scheduler (either receive or transmit) program thread coordinates amounts of work to be done and sequence of work by processing program threads. The scheduler program thread assigns tasks to processing program threads and in some cases processing program threads can assign tasks to other processing program threads. For instance, a scheduler determines which ports need service and assigns and coordinates tasks to processing program threads to overcome inherent memory latency by processing multiple program threads in parallel.

In some examples, with slow ports one processing program thread may perform processing on a portion of a packet and a second processing program thread processes the remainder of the packet or in some cases the scheduler uses the next available program thread. With faster ports e.g., Gigabit ports where 64 byte packets are received very fast, the scheduler can assign M packets to the next available program thread. The program threads signal each other as to what part of a packet the program thread has processed and its status.

A program thread can be assigned to process the first 64 bytes of a packet. When the program thread is finish, the program thread has data to set signals to wake up the next program thread has been assigned to process the next 64 bytes. The program thread may write a register and an address of the register in a pre-assigned memory location, e.g., scratch register. The program thread sets signals to wake up the next program thread that has been assigned to work on the next bytes of the packet.

Figure 7A:
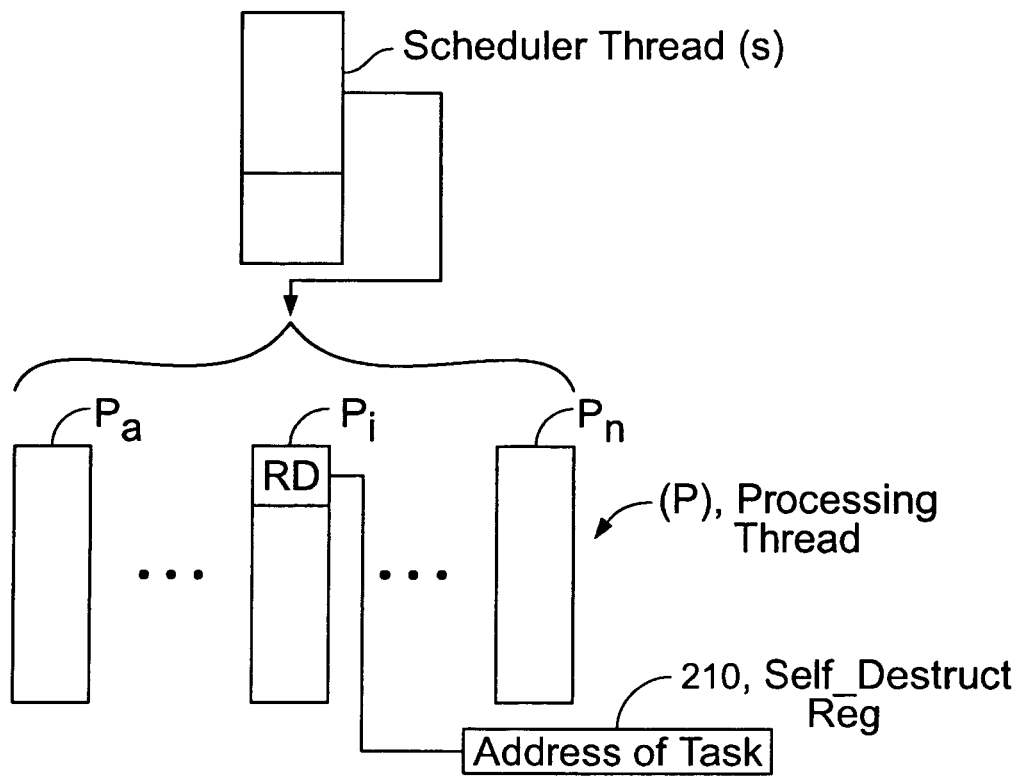
FIGS. 7A–7B are a pictorial representation and flow chart useful in understanding program thread signaling with a clear on read register.
Figure 7B:
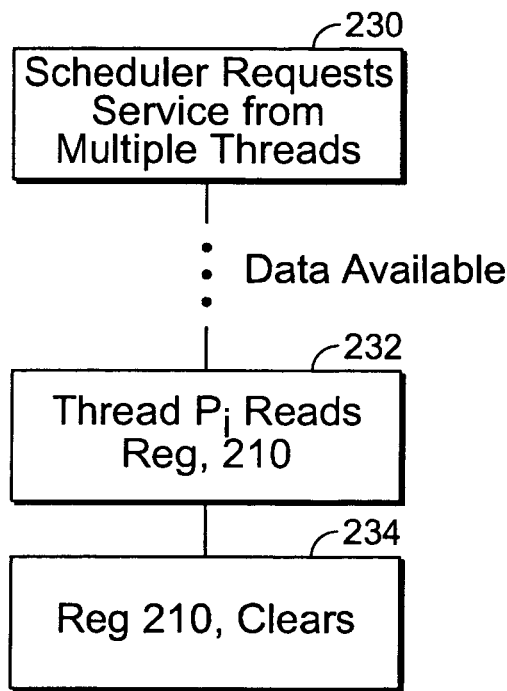

Referring to FIGS. 7A–7B, the self-destruct register 210 allows one scheduler program thread S, (230 in FIG. 7B) to request services from multiple program threads $P_a$–$P_n$ that provide the requested service. The first program thread, e.g., $P_i$ that accesses (232 in FIG. 7B) the self_destruct register 210 takes the request. The "self-destruct register" 210 zeros, i.e., clears (234 in FIG. 7B) upon being read by a program thread. Other program threads capable of servicing that request will no longer be presented with an active request. For example, a program context can request a task be assigned to the first context that is ready, by writing to the self-destruct register 210. A context checks for an assignment by reading the "self-destruct register" 210. If the value of the self destruct register is 0, there is no new task presently available to assign to the program thread. This could indicate that there are no new tasks or that another program thread may have assigned itself to the task and cleared the self destruct register 210. If the value is non-zero, the contents of the self destruct register are interpreted to determine the task, and the register is cleared upon reading by the context. Thus, contexts reading this register for assignment wait for the register to be written subsequently with the next task instruction.

Figure 8:
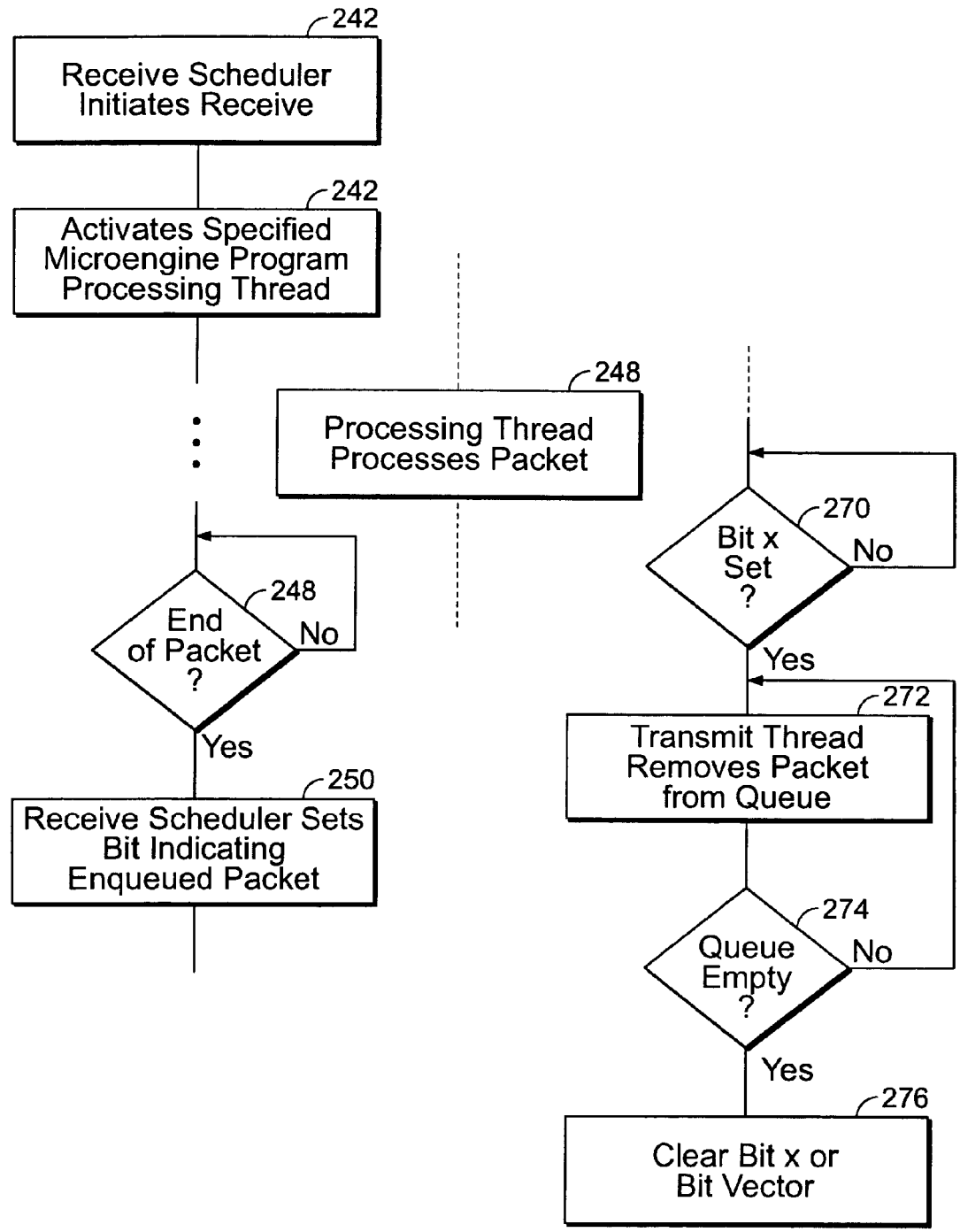
FIG. 8 is a flow chart of an inter-thread signaling scheme.

Referring to FIG. 8, for networking applications typically different program contexts are used to perform specific system tasks. Tasks include receive scheduling, receive processing contexts, transmit arbiter, transmit scheduling, transmit filling and processor core communications.

The receive scheduler initiates 242 a receive operation of e.g., 64 or 128 bytes of input data by sending a command to the FBI interface 28 that specifies a port from which to extract the data and the Receive FIFO element to use to buffer that data as well as the microengine context to be notified once the receive data has been fetched.

The receive scheduler thread 244 sends a signal to the specified microengine program thread that activates a specified context. The context reads the FBI Receive Control register to obtain the necessary receive information for processing (i.e. port, Receive FIFO element location, byte count, start of packet, end of packet, error status). If a start of packet is indicated the receive scheduler program thread is responsible for determining where in SDRAM to store the data, (i.e., the output queue to insert the packet) and writing the packet data into SDRAM. If it is not the start of a packet, then the receive program thread determines where the earlier data of this packet was stored in order to continue processing 246 of the packet. When the end of packet indication is received 248 (or after the first 64 byte section if receive to transmit latency is optimized) the receive program thread adds the packet to the queue determined by processing the packet header.

The program threads also communicate with a shared resource through a bit set and bit clear mechanism that provides a bit vector. This mechanism allows setting and clearing of individual bits and performing a test and set on individual bits to control a shared resource. The bit vector signals the non-emptiness of output queues. When a receive program thread enqueues a packet, the receive scheduler sets 250 a bit. The transmit scheduler can examine the bit vector to determine the state all queues.

The bit set and bit clear operations on the bit vector, can occur in either scratchpad RAM or SRAM. If the scheduler is communicating between program threads on the same microengine 22, the bit vector can be stored in the register set because each context can read the other context's registers. For example, an empty or not empty status of each output queue is support by a bit vector in internal scratchpad memory. When a receive program thread enqueues a packet, the receive program thread uses the scratch pad bit-set command to set a bit in the queue status bit vector to indicate the queue now has at least one entry. The transmit arbiter scans 270 the queue bit vector for non empty queues (e.g., $bit_x$ set) to determine packets that are ready to be transmitted. When removing 272 a packet from a queue for transmit if the queue empties 274, the transmit arbiter issues 276 a bit-clear command to the corresponding bit of the queue bit vector.

Figure 9:
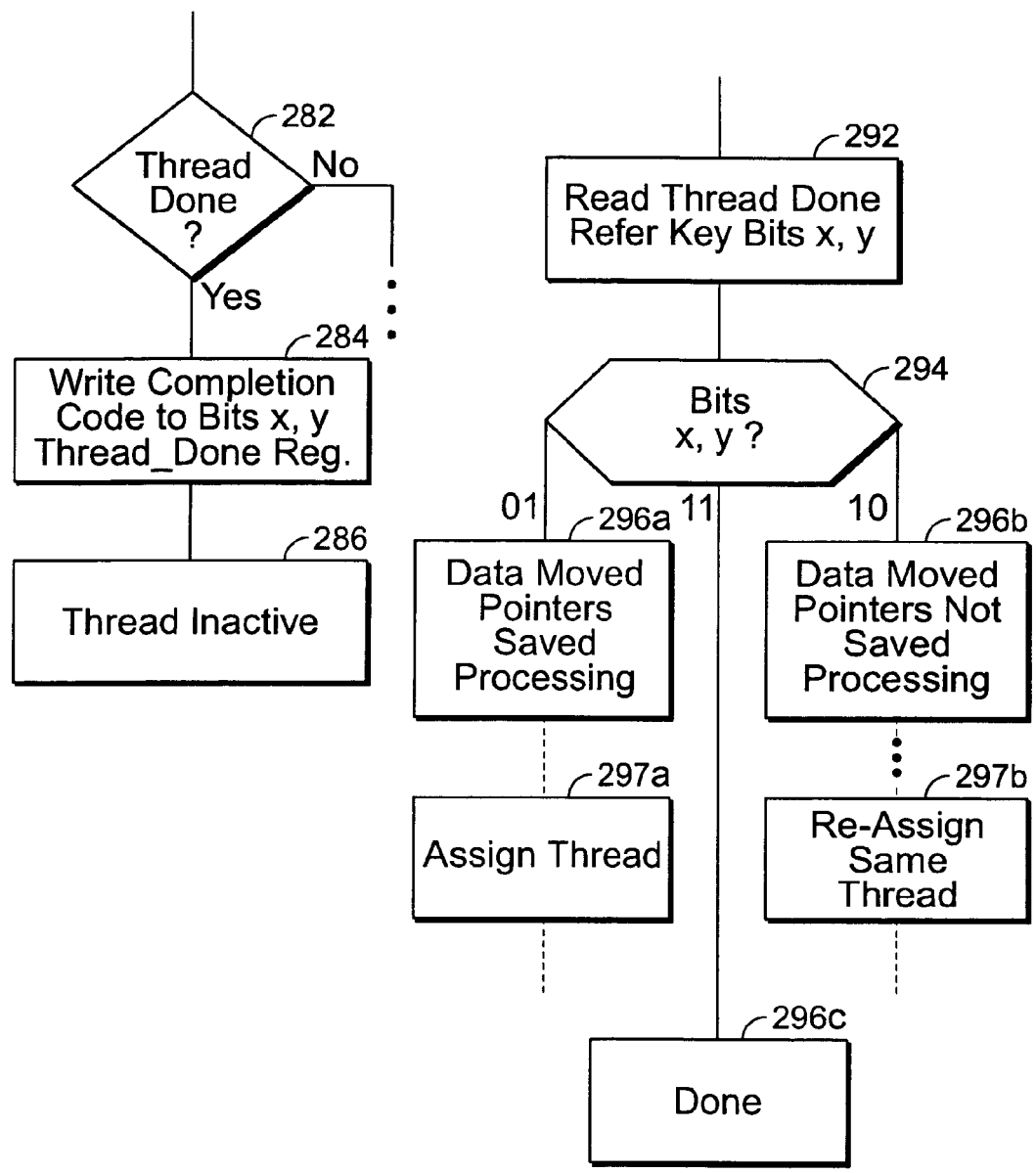
FIG. 9 is a flow chart of a program thread status reporting process.

Referring to FIG. 9, the thread_done register is also on the FBI 28 and is a register where bits can be set from different program threads. Each program thread can use, e.g., two bits to communicate its status to all other program threads. Also one scheduler program thread can read 292 the status of all of its processing program threads. Upon completion of a receive task, 282 a "receive" program thread writes 284 a completion code into the "thread_done" register. The receive program thread becomes inactive 286 after writing the thread_done register. That receive program thread waits for another signal from the FBI that indicates another receive task has been assigned. Program threads 1–16 have 2 bit fields for "thread_done_1", and program threads 17–24 have 2 bit fields for "thread_done_2". The 2 bit field allows a program thread to communicate different levels of task completion.

For example, the scheduler can use the two bit status "01" to indicate that data was moved to SDRAM, processing of packet is still in progress and pointers were saved; bits 10 can indicate that data was moved to SDRAM, processing of packet is still in progress and pointers were not saved; and bits 11 can indicates packet processing is completed. Thus, the states 296a can be used by the receiver scheduler program thread to assign 297a another thread to process a task when data becomes available, whereas, states 296b can be used by the receive scheduler to assign 297b the same thread to continue processing when the data is available.

The exact interpretation of the message can be fixed by a software convention determined between a scheduler program thread and processing program threads called by the scheduler program thread. That is the status messages can change depending on whether the convention is for receive, as above, transmit, and so forth. In general, the status messages include "busy", "not busy", "not busy but waiting." The status message of "not busy, but waiting" signals that the current program thread has completed processing of a portion of a packet and is expected to be assigned to perform a subsequent task on the packet when data is made available. It can be used when the program thread is expecting data from a port and has not saved context so it should process the rest of that packet.

The scheduler program thread reads the "thread done" register to determine the completion status of tasks it assigned to other program threads. The "thread done" register is implemented as a write one to clear register, allowing the scheduler to clear just the fields it has recognized.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for network packet processing comprises:
  receiving network packets at a processor having multiple engines collectively providing multiple program threads, each of the multiple engines having multiple program counters for different program threads provided by the respective engine; and
  operating on the network packets with a plurality of the program threads to affect processing of the packets, at least one of the threads accessing a self-destruct register that automatically resets to a null value after a read of the self-destruct register to determine if a packet processing task is awaiting performance, and wherein if a one of the plurality of program threads accesses a non-null self-destruct register value representing a packet processing task awaiting performance, the self-destruct register automatically resets to a null value and the one of the plurality of program threads causes the packet processing task to be performed.

2. The method of claim 1 wherein operating comprises:
  using at least one program thread to inspect a header portion of the packet.

3. The method of claim 2 wherein operating further comprises:
  signaling by the at least one program thread that a packet header has been processed.

4. The method of claim 1, wherein the plurality of program threads comprise at least one scheduler program thread to schedule task orders for processing and processing program threads that process packets in accordance with task assignments assigned by the scheduler program threads.

5. The method of claim 4 wherein the scheduler program thread can schedule one of a plurality of processing program threads to handle processing of a task.

6. The method of claim 5 wherein the scheduler program thread writes a third register with an address corresponding to a location of data for the plurality of processing program threads.

7. The method of claim 6 wherein a one of the plurality of processing program threads that can handle the task reads the third register to obtain the location of the data.

8. The method of claim 7 wherein the one of the plurality of processing program threads reads the third register to obtain the location of the data and to assign itself to processing the task requested by the scheduler program thread.

9. The method of claim 7 wherein the third register consists of the self-destruct, and wherein the one of the plurality of processing tasks reads the third register to obtain the location of the data.

10. The method of claim 9 wherein when another one of the plurality of processing program threads assignable to the task reads the third register, it is provided with a null value that indicates that there is no task for the processing program thread.

11. The method of claim 1 wherein each program thread writes a message to a second register that indicates the program thread's current status.

12. The method of claim 11 wherein interpretation of the message is fixed by a software convention determined between a scheduler program thread and processing program threads called by the scheduler program thread.

13. The method of claim 11 wherein status messages include busy, not busy, not busy but waiting.

14. The method of claim 11 wherein a status message includes not busy, but waiting and wherein the status of not busy, but waiting signals that the current program thread has completed processing of a portion of a packet and is expected to be assigned to perform a subsequent task on the packet when data is made available to continue processing of the program thread.

15. The method of claim 11 wherein the second register is a register that can be read from or written to by different ones of the program threads executed by different ones of the multiple engines.

16. A parallel hardware-based multithreaded processor comprises:
a plurality of microengines that support multiple program threads, each of the multiple engines having multiple program counters for different program threads provided by the respective engine; and
a self-destruct register that automatically resets to a null value after a read of the self-destruct register; wherein at least some of the plurality of program threads are capable of accessing a self-destruct register that automatically resets to a null value upon a read to determine if a packet processing task is awaiting performance, and if a one of the plurality of program threads accesses a non-null self-destruct register value representing a packet processing task awaiting performance, the self-destruct register is reset to a null value and the one of the plurality of program threads causes the packet processing task to be performed.

17. The processor of claim 16 wherein one of the plurality of microengines executes at least one scheduler program thread and other ones of the microengines execute processing program threads.

18. The processor of claim 16 further comprising a second register wherein multiple program threads write a message to the second status register that indicates the threads respective current status.

19. The processor of claim 18 wherein interpretation of the message is fixed by a software convention determined between a scheduler program thread and processing program threads called by the scheduler program thread.

20. The processor of claim 16, wherein a program thread writes the self-destruct register and when a one of the plurality of processing program threads reads the register, the one of the plurality of processing program threads assigns itself to processing a task.

21. The processor of claim 20 wherein when another one of the plurality of processing program threads reads the register, the another one of the plurality of processing program threads is provided with a null value that indicates that there is no task to assign.

22. An apparatus comprising a machine-readable storage medium having executable instructions for network processing, the instructions enabling the apparatus to: receive network packets; and
operate on the network packets with a plurality of program threads collectively provided by multiple engines of a processor to affect processing of the packets, each of the multiple engines having multiple program counters for different program threads provided by the respective engine, wherein at least some of the plurality of program threads access a self-destruct register that automatically resets to a null value upon a read to determine if a packet processing task is awaiting performance, and wherein if a one of the plurality of program threads accesses a non-null self-destruct register value representing a packet processing task awaiting performance, the self-destruct register is reset to a null value and the one of the plurality of program threads causes the packet processing task to be performed.

23. The apparatus of claim 22 wherein instructions to operate further comprise instructions to:
use at least one program thread to inspect a header portion of the packet.

24. The apparatus of claim 22 further comprising instructions to provide scheduler program threads to schedule task orders for processing and processing program threads to process packets in accordance with task assignments assigned by the scheduler program threads.

25. The apparatus of claim 22 wherein each program thread writes a message to a second register that indicates the thread's current status.

26. The apparatus of claim 25 wherein the second register is a register that can be read from or written to by all current program threads.

27. The apparatus of claim 22 wherein when another one of the plurality of processing program threads reads the self-destruct register, the one of the plurality of processing program threads is provided with a null value that indicates that there is no task for the processing program thread.

* * * * *